(12) United States Patent
Li et al.

(10) Patent No.: US 10,659,345 B2
(45) Date of Patent: May 19, 2020

(54) SERVICE PATH PROTECTION METHOD, CONTROLLER, DEVICE AND SYSTEM

(71) Applicant: Huawei Technologies Co., Ltd., Shenzhen, Guangdong (CN)

(72) Inventors: Gang Li, Chengdu (CN); Yi Lin, Shenzhen (CN); Jianrui Han, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 396 days.

(21) Appl. No.: 15/058,783

(22) Filed: Mar. 2, 2016

(65) Prior Publication Data

US 2016/0182363 A1    Jun. 23, 2016

Related U.S. Application Data

(63) Continuation of application No. PCT/CN2013/082868, filed on Sep. 3, 2013.

(51) Int. Cl.
*H04L 12/707* (2013.01)
*H04L 12/703* (2013.01)
(Continued)

(52) U.S. Cl.
CPC ........... *H04L 45/22* (2013.01); *H04B 1/0003* (2013.01); *H04L 41/0654* (2013.01);
(Continued)

(58) Field of Classification Search
CPC ..... H04B 1/0003; H04L 45/22; H04L 45/021; H04L 45/38; H04L 45/28; H04L 67/16; H04L 41/0654; H04W 8/30
See application file for complete search history.

(56) References Cited

U.S. PATENT DOCUMENTS 7,212,742 B2     5/2007 Peddanarappagari et al.
2003/0084367 A1   5/2003 Suemura
(Continued)

FOREIGN PATENT DOCUMENTS

CN     101888323 A    11/2010
CN     101958809 A     1/2011
(Continued)

OTHER PUBLICATIONS

Sachin Sharma et al., "Enabling Fast Failure Recovery in OpenFlow Networks", 2011 8th International Workshop on the Design of Reliable Communication Networks (DRCN), Oct. 10, 2011, p. 164-171.
(Continued)

*Primary Examiner* — Omer S Mian
(74) *Attorney, Agent, or Firm* — Womble Bond Dickinson (US) LLP

(57) ABSTRACT

Embodiments of the present invention provide a service path protection method, a controller, a device and a system. The method includes: receiving, by an end node of a protection path, a path selection instruction sent by an SDN controller, wherein the path selection instruction comprises a service path and protection path activation type, forwarding relationships respectively of a service path and the protection path in the end node; activating at least one forwarding relationship according to the service path and protection path activation type; and when a fault occurs in the service path, updating the at least one forwarding relationship according to the service path and protection path activation type. The embodiments of the present invention relate to the field of communications technologies and resolve a problem that in an SDN technology, when a fault occurs in a service path, a protection path cannot be used.

15 Claims, 11 Drawing Sheets

(51) Int. Cl.
*H04L 12/721* (2013.01)
*H04L 12/755* (2013.01)
*H04B 1/00* (2006.01)
*H04L 12/24* (2006.01)
*H04L 29/08* (2006.01)

(52) U.S. Cl.
CPC .......... *H04L 45/021* (2013.01); *H04L 45/28* (2013.01); *H04L 45/38* (2013.01); *H04L 67/16* (2013.01)

(56) References Cited

U.S. PATENT DOCUMENTS

| | | |
|---|---|---|
| 2004/0208511 A1 | 10/2004 | Peddanarappagari et al. |
| 2011/0075549 A1 | 3/2011 | Lu et al. |
| 2011/0286324 A1 | 11/2011 | Bellagamba et al. |
| 2013/0077479 A1 | 3/2013 | Ryoo et al. |
| 2013/0195110 A1 | 8/2013 | Kojima |
| 2014/0280834 A1* | 9/2014 | Medved ............... H04L 47/122 709/223 |
| 2015/0295818 A1* | 10/2015 | Hayashitani ............ H04L 45/28 370/221 |
| 2015/0319057 A1* | 11/2015 | Jocha ................... H04L 43/026 370/241.1 |
| 2015/0372902 A1* | 12/2015 | Giorgetti ................ H04L 45/64 370/219 |

FOREIGN PATENT DOCUMENTS

| | | |
|---|---|---|
| CN | 102143065 A | 8/2011 |
| CN | 102204190 A | 9/2011 |
| CN | 102984058 A | 3/2013 |
| CN | 103155501 A | 6/2013 |
| EP | 2 555 469 A1 | 2/2013 |
| EP | 2 922 248 A1 | 9/2015 |

OTHER PUBLICATIONS

James Kempf et al., "Scalable Fault Management for OpenFlow", Jun. 10, 2012, 5 pages.
Nick McKeown et al., "OpenFlow: Enabling Innovation in Campus Networks", Mar. 14, 2008, 6 pages.
"OpenFlow Switch Specification", Version 1.3.1, Open Networking Foundation, Sep. 6, 2012, 128 pages.

\* cited by examiner

US 10,659,345 B2

SERVICE PATH PROTECTION METHOD, CONTROLLER, DEVICE AND SYSTEM

CROSS-REFERENCE TO RELATED APPLICATIONS

This application is a continuation of International Application No. PCT/CN2013/082868, filed on Sep. 3, 2013, which is hereby incorporated by reference in its entirety.

TECHNICAL FIELD

The present invention relates to the field of communications technologies, and in particular, to a service path protection method, a controller, a device and a system.

BACKGROUND

Software defined networking (SDN) is an innovative network architecture, separates a control plane of a network from an actual structure of a physical topology, and provides a programmable interface for the control plane, where hardware devices in the physical topology do not control routing of packets anymore by using respective software, but receive forwarding rules from the control plane, and forward the packets according to these rules. In this way, in a network of a range (or referred to as an SDN domain), a centralized and unified control logic unit performs management on the network in the range, so as to resolve a management problem of a large quantity of disperse forwarding devices independently running in the network, so that design, deployment, operation and maintenance, and management of the network are completed by a control point, and differentiation of an underlying network is eliminated. The centralized and unified control logic unit may be an SDN controller, that is, the SDN controller provides a control plane, to perform unified control and management on devices in the SDN domain administrated by the SDN controller.

For devices administrated by the SDN controller, the SDN controller needs to send control commands to the devices to control forwarding rules of the devices, so that a data packet, forwarded according to a forwarding rule indicated by the SDN controller, of a specified service is transmitted on a service path constituted by the devices, but a fault may occur in an entire path or apart of the service path. When a fault occurs in the service path, to ensure normal transmission of the data packet of the specified service, generally a manner of pre-allocating resources is used to preset a protection path for the entire path of the service path or a part, in which a fault easily occurs, of the service path. However, in the SDN technology, how the SDN controller continues to perform data transmission for the specified service by using the protection path corresponding to the service path when a fault occurs in the service path, to protect the faulty service path is a problem urgently to be resolved in the prior art.

SUMMARY

Embodiments of the present invention provide a service path protection method, a controller, a device and a system, so as to resolve a problem that in an SDN technology, when a fault occurs in a service path, a protection path cannot be used to protect the service path.

According to a first aspect, a service path protection method is provided, including:

receiving, by an end node of a protection path, a path selection instruction sent by a SDN controller, where the path selection instruction includes a service path and protection path activation type, a forwarding relationship of a service path in the end node, and a forwarding relationship of the protection path in the end node;

activating, by the end node of the protection path, at least one forwarding relationship of the forwarding relationship of the service path in the end node and the forwarding relationship of the protection path in the end node according to the service path and protection path activation type; and updating, by the end node of the protection path, the at least one forwarding relationship of the forwarding relationship of the service path in the end node and the forwarding relationship of the protection path in the end node according to the service path and protection path activation type when it is determined that a fault occurs in the service path, where the protection path is a standby path for protecting a path between specified nodes on the service path.

With reference to the first aspect, in a first possible implementation manner, when the end node of the protection path is a source node of the protection path, the activating, by the end node of the protection path, at least one forwarding relationship of the forwarding relationship of the service path in the end node and the forwarding relationship of the protection path in the end node according to the service path and protection path activation type specifically includes: when the service path and protection path activation type is used to instruct the source node to enable the service path and the protection path, separately activating a forwarding relationship of the service path in the source node and a forwarding relationship of the protection path in the source node; or when the service path and protection path activation type is used to instruct the source node to enable the service path, activating a forwarding relationship of the service path in the source node.

With reference to the first aspect, in a second possible implementation manner, when the end node of the protection path is a sink node of the protection path, the service path and protection path activation type is used to instruct the sink node to enable the service path; and the activating, by the end node of the protection path, at least one forwarding relationship of the forwarding relationship of the service path in the end node and the forwarding relationship of the protection path in the end node according to the service path and protection path activation type specifically includes: activating, by the sink node of the protection path, a forwarding relationship of the service path in the sink node according to the service path and protection path activation type.

With reference to the first aspect, in a third possible implementation manner, the method further includes: receiving a monitoring instruction sent by the SDN controller and used to instruct the end node of the protection path to monitor at least one path of the service path and the protection path; and after the activating, by the end node of the protection path, at least one forwarding relationship of the forwarding relationship of the service path in the end node and the forwarding relationship of the protection path in the end node according to the service path and protection path activation type, the method further includes: monitoring, according to the monitoring instruction, the at least one path indicated in the monitoring instruction.

With reference to the first aspect, in a fourth possible implementation manner, after the activating, by the end node of the protection path, at least one forwarding relationship of the forwarding relationship of the service path in the end node and the forwarding relationship of the protection path in the end node according to the service path and protection path activation type, the method further includes: sending a notification message indicating that forwarding relationship activation is completed to the SDN controller; receiving a monitoring instruction sent by the SDN controller and used to instruct the end node of the protection path to monitor at least one path of the service path and the protection path; and monitoring, according to the monitoring instruction, the at least one path indicated in the monitoring instruction.

With reference to the third possible implementation manner of the first aspect, or the fourth possible implementation manner of the first aspect, in a fifth possible implementation manner, the monitoring, according to the monitoring instruction, the at least one path indicated in the monitoring instruction specifically includes: monitoring, according to the monitoring instruction, service data transmission on the at least one path indicated in the monitoring instruction and/or a physical link of the at least one path indicated in the monitoring instruction.

With reference to the first aspect, the first possible implementation manner of the first aspect, the second possible implementation manner of the first aspect, the third possible implementation manner of the first aspect, or the fourth possible implementation manner of the first aspect, in a sixth possible implementation manner, the updating, by the end node of the protection path, the at least one forwarding relationship of the forwarding relationship of the service path in the end node and the forwarding relationship of the protection path in the end node according to the service path and protection path activation type when it is determined that a fault occurs in the service path specifically includes: invalidating, by the end node of the protection path, the forwarding relationship of the service path in the end node; and when it is determined that a fault occurs in the service path, the method further includes: sending, to the SDN controller, a notification message used to notify the SDN controller that the service path is already disabled and the protection path is enabled for data transmission.

With reference to the sixth possible implementation manner of the first aspect, in a seventh possible implementation manner, when the end node of the protection path is the source node of the protection path and the service path and protection path activation type is used to instruct the source node to enable the service path or when the end node of the protection path is the sink node of the protection path, and when it is determined that a fault occurs in the service path, before or after the invalidating, by the end node of the protection path, the forwarding relationship of the service path in the end node, the method further includes: activating the forwarding relationship of the protection path in the end node.

With reference to the first aspect, the first possible implementation manner of the first aspect, the second possible implementation manner of the first aspect, the third possible implementation manner of the first aspect, or the fourth possible implementation manner of the first aspect, in an eighth possible implementation manner, when the end node of the protection path is the source node of the protection path and the service path and protection path activation type is used to instruct the source node to enable the service path or when the end node of the protection path is the sink node of the protection path, the updating, by the end node of the protection path, the at least one forwarding relationship of the forwarding relationship of the service path in the end node and the forwarding relationship of the protection path in the end node according to the service path and protection path activation type when it is determined that a fault occurs in the service path specifically includes: when it is determined that a fault occurs in the service path, sending, by the end node of the protection path to the SDN controller, a fault report used to notify the SDN controller that a fault occurs in the service path; receiving a switchover instruction sent by the SDN controller and used to enable the protection path to replace the service path; and invalidating the forwarding relationship of the service path in the end node and activating the forwarding relationship of the protection path in the end node according to the switchover instruction.

With reference to the first aspect, the first possible implementation manner of the first aspect, the second possible implementation manner of the first aspect, the third possible implementation manner of the first aspect, or the fourth possible implementation manner of the first aspect, in a ninth possible implementation manner, when there are at least two protection paths for the path between the specified nodes on the service path, the path selection instruction is further used to indicate priorities of the protection paths; and when the end node of the protection path is the source node of the protection path and the service path and protection path activation type is used to instruct the source node to enable the service path or when the end node of the protection path is the sink node of the protection path, the updating, by the end node of the protection path, the at least one forwarding relationship of the forwarding relationship of the service path in the end node and the forwarding relationship of the protection path in the end node according to the service path and protection path activation type when it is determined that a fault occurs in the service path specifically includes: when it is determined that a fault occurs in the service path, determining, by the end node of the protection path, a protection path having a highest priority; and activating a forwarding relationship of the protection path having the highest priority in the end node and invalidating the forwarding relationship of the service path in the end node.

According to a second aspect, a service path protection method is provided, including:

for an end node of a protection path, sending a path selection instruction to the end node of the protection path, where the path selection instruction includes a service path and protection path activation type, a forwarding relationship of a service path in the end node, and a forwarding relationship of the protection path in the end node, where the service path and protection path activation type is used by the end node of the protection path to activate at least one forwarding relationship of the forwarding relationship of the service path in the end node and the forwarding relationship of the protection path in the end node according to the service path and protection path activation type; and when it is determined that a fault occurs in the service path, the end node of the protection path updates the at least one forwarding relationship of the forwarding relationship of the service path in the end node and the forwarding relationship of the protection path in the end node according to the service path and protection path activation type, where the protection path is a standby path for protecting a path between specified nodes on the service path.

With reference to the second aspect, in a first possible implementation manner, for a node, except the end node of the protection path, on the service path and the protection path, the method further includes: sending a path selection instruction to the node, where the path selection instruction includes a forwarding relationship, of a path on which the node is located, in the node, and the forwarding relationship, of the path on which the node is located, in the node is used to instruct the node to activate the forwarding relationship, of the path on which the node is located, in the node.

With reference to the second aspect, in a second possible implementation manner, the method further includes: sending a monitoring instruction used to instruct the end node of the protection path to monitor at least one path of the service path and the protection path to the end node of the protection path.

With reference to the second aspect, in a third possible implementation manner, after the sending a path selection instruction to the end node of the protection path, the method further includes: receiving a notification message sent by the end node of the protection path and indicating that forwarding relationship activation is completed; and sending a monitoring instruction used to instruct the end node of the protection path to monitor at least one path of the service path and the protection path to the end node of the protection path.

With reference to the second aspect, the first possible implementation manner of the second aspect, the second possible implementation manner of the second aspect, or the third possible implementation manner of the second aspect, in a fourth possible implementation manner, the method further includes: when it is determined that a fault occurs in the service path, receiving a notification message sent by the end node of the protection path and used to notify that the service path is already disabled and the protection path is enabled for data transmission.

With reference to the second aspect, the first possible implementation manner of the second aspect, the second possible implementation manner of the second aspect, or the third possible implementation manner of the second aspect, in a fifth possible implementation manner, the method further includes: when it is determined that a fault occurs in the service path, receiving a fault report sent by the end node of the protection path and used to notify that a fault occurs in the service path; and sending a switchover instruction used to enable the protection path to replace the service path to the end node of the protection path, where the switchover instruction is used to instruct the end node of the protection path to invalidate the forwarding relationship of the service path in the end node and activate the forwarding relationship of the protection path in the end node.

With reference to the second aspect, the first possible implementation manner of the second aspect, the second possible implementation manner of the second aspect, or the third possible implementation manner of the second aspect, in a sixth possible implementation manner, when there are at least two protection paths for the path between the specified nodes on the service path, the path selection instruction is further used to indicate priorities of the protection paths.

According to a third aspect, a device is provided, applied to an end node of a protection path, including:

a receiving module, configured to receive a path selection instruction sent by a SDN controller, where the path selection instruction includes a service path and protection path activation type, a forwarding relationship of a service path in the end node, and a forwarding relationship of the protection path in the end node, and the protection path is a standby path for protecting a path between specified nodes on the service path;

an activation module, configured to activate at least one forwarding relationship of the forwarding relationship of the service path in the end node and the forwarding relationship of the protection path in the end node according to the service path and protection path activation type received by the receiving module; and an updating module, configured to: when it is determined that a fault occurs in the service path, update the at least one forwarding relationship of the forwarding relationship of the service path in the end node and the forwarding relationship of the protection path in the end node according to the service path and protection path activation type received by the receiving module.

With reference to the third aspect, in a first possible implementation manner, the activation module is specifically configured to: when the device is a source node of the protection path and the service path and protection path activation type is used to instruct the source node to enable the service path and the protection path, separately activate a forwarding relationship of the service path in the source node and a forwarding relationship of the protection path in the source node; or when the service path and protection path activation type is used to instruct the source node to enable the service path, activate a forwarding relationship of the service path in the source node.

With reference to the third aspect, in a second possible implementation manner, the activation module is specifically configured to: when the device is a sink node of the protection path, activate a forwarding relationship of the service path in the sink node according to the service path and protection path activation type, where the service path and protection path activation type is used to instruct the sink node to enable the service path.

With reference to the third aspect, in a third possible implementation manner, the device further includes: a first monitoring module, where the receiving module is further configured to receive a monitoring instruction sent by the SDN controller and used to instruct the device to monitor at least one path of the service path and the protection path; and the first monitoring module is configured to: after the activation module activates the at least one forwarding relationship of the forwarding relationship of the service path in the end node and the forwarding relationship of the protection path in the end node, monitor, according to the monitoring instruction received by the receiving module, the at least one path indicated in the monitoring instruction.

With reference to the third possible implementation manner of the third aspect, in a fourth possible implementation manner, the first monitoring module is specifically configured to monitor, according to the monitoring instruction, service data transmission on the at least one path indicated in the monitoring instruction and/or a physical link of the at least one path indicated in the monitoring instruction.

With reference to the third aspect, in a fifth possible implementation manner, the device further includes a sending module and a second monitoring module, where the sending module is configured to: after the activation module activates the at least one forwarding relationship of the forwarding relationship of the service path in the end node and the forwarding relationship of the protection path in the end node, send a notification message indicating that forwarding relationship activation is completed to the SDN controller; the receiving module is further configured to: after the sending module sends the notification message, receive a monitoring instruction sent by the SDN controller and used to instruct the device to monitor at least one path of the service path and the protection path; and the second monitoring module is configured to: after the receiving module receives the monitoring instruction, monitor, according to the monitoring instruction, the at least one path indicated in the monitoring instruction.

With reference to the fifth possible implementation manner of the third aspect, in a sixth possible implementation manner, the second monitoring module is specifically configured to monitor, according to the monitoring instruction, service data transmission on the at least one path indicated in the monitoring instruction and/or a physical link of the at least one path indicated in the monitoring instruction.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a seventh possible implementation manner, the updating module is specifically configured to: when it is determined that a fault occurs in the service path, invalidate the forwarding relationship of the service path in the end node; and the sending module is further configured to: when it is determined that a fault occurs in the service path, send, to the SDN controller, a notification message used to notify the SDN controller that the service path is already disabled and the protection path is enabled for data transmission.

With reference to the seventh possible implementation manner of the third aspect, in an eighth possible implementation manner, the updating module is further configured to: when the device is the source node of the protection path and the service path and protection path activation type is used to instruct the source node to enable the service path or when the device is the sink node of the protection path, when it is determined that a fault occurs in the service path, and before or after the device invalidates the forwarding relationship of the service path in the end node, activate the forwarding relationship of the protection path in the end node.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a ninth possible implementation manner, the updating module is specifically configured to: when the device is the source node of the protection path and the service path and protection path activation type is used to instruct the source node to enable the service path or when the device is the sink node of the protection path, and when it is determined that a fault occurs in the service path, send, to the SDN controller, a fault report used to notify the SDN controller that a fault occurs in the service path; receive a switchover instruction sent by the SDN controller and used to enable the protection path to replace the service path; and invalidate the forwarding relationship of the service path in the end node and activate the forwarding relationship of the protection path in the end node according to the switchover instruction.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a tenth possible implementation manner, the updating module is specifically configured to: when the device is the source node of the protection path and the service path and protection path activation type is used to instruct the source node to enable the service path or when the device is the sink node of the protection path, and when it is determined that a fault occurs in the service path and there are at least two protection paths for the path between the specified nodes on the service path, determine, according to priorities indicated in the path selection instruction and of the protection paths, a protection path having a highest priority; activate a forwarding relationship of the protection path having the highest priority in the end node and invalidate the forwarding relationship of the service path in the end node.

According to a fourth aspect, an SDN controller is provided, including:

a sending module, configured to: for an end node of a protection path, send a path selection instruction to the end node of the protection path, where the path selection instruction includes a service path and protection path activation type, a forwarding relationship of a service path in the end node, and a forwarding relationship of the protection path in the end node, where the service path and protection path activation type is used by the end node of the protection path to activate at least one forwarding relationship of the forwarding relationship of the service path in the end node and the forwarding relationship of the protection path in the end node according to the service path and protection path activation type; and when it is determined that a fault occurs in the service path, the end node of the protection path updates the at least one forwarding relationship of the forwarding relationship of the service path in the end node and the forwarding relationship of the protection path in the end node according to the service path and protection path activation type, where the protection path is a standby path for protecting a path between specified nodes on the service path.

With reference to the fourth aspect, in a first possible implementation manner, the sending module is further configured to: for a node, except the end node of the protection path, on the service path and the protection path, send a path selection instruction to the node, where the path selection instruction includes a forwarding relationship, of a path on which the node is located, in the node, and the forwarding relationship, of the path on which the node is located, in the node is used to instruct the node to activate the forwarding relationship, of the path on which the node is located, in the node.

With reference to the fourth aspect, in a second possible implementation manner, the sending module is further configured to send a monitoring instruction used to instruct the end node of the protection path to monitor at least one path of the service path and the protection path to the end node of the protection path.

With reference to the fourth aspect, in a third possible implementation manner, the SDN controller further includes a receiving module, where the receiving module is configured to: after the path selection instruction is sent to the end node of the protection path, receive a notification message sent by the end node of the protection path and indicating that forwarding relationship activation is completed; and the sending module is further configured to send a monitoring instruction used to instruct the end node of the protection path to monitor at least one path of the service path and the protection path to the end node of the protection path.

With reference to the fourth aspect, the first possible implementation manner of the fourth aspect, the second possible implementation manner of the fourth aspect, or the third possible implementation manner of the fourth aspect, in a fourth possible implementation manner, the receiving module is further configured to: when it is determined that a fault occurs in the service path, receive a notification message sent by the end node of the protection path and used to notify that the service path is already disabled and the protection path is enabled for data transmission.

With reference to the fourth aspect, the first possible implementation manner of the fourth aspect, the second possible implementation manner of the fourth aspect, or the third possible implementation manner of the fourth aspect, in a fifth possible implementation manner, the receiving module is further configured to: when it is determined that a fault occurs in the service path, receive a fault report sent by the end node of the protection path and used to notify that a fault occurs in the service path; and the sending module is further configured to send a switchover instruction used to enable the protection path to replace the service path to the end node of the protection path, where the switchover instruction is used to instruct the end node of the protection path to invalidate the forwarding relationship of the service path in the end node and activate the forwarding relationship of the protection path in the end node.

According to a fifth aspect, a service path protection system is provided, including the device provided in the third aspect and any possible implementation manner of the third aspect and the SDN controller provided in the fourth aspect and any possible implementation manner of the fourth aspect.

According to a sixth aspect, a device is provided, applied to an end node of a protection path, including:

a receiver, configured to receive a path selection instruction sent by a SDN controller, where the path selection instruction includes a service path and protection path activation type, a forwarding relationship of a service path in the end node, and a forwarding relationship of the protection path in the end node, and the protection path is a standby path for protecting a path between specified nodes on the service path; and a processor, configured to activate at least one forwarding relationship of the forwarding relationship of the service path in the end node and the forwarding relationship of the protection path in the end node according to the service path and protection path activation type received by the receiver, and when it is determined that a fault occurs in the service path, update the at least one forwarding relationship of the forwarding relationship of the service path in the end node and the forwarding relationship of the protection path in the end node according to the service path and protection path activation type received by the receiver.

According to a seventh aspect, an SDN controller is provided, including:

a transmitter, configured to: for an end node of a protection path, send a path selection instruction to the end node of the protection path, where the path selection instruction includes a service path and protection path activation type, a forwarding relationship of a service path in the end node, and a forwarding relationship of the protection path in the end node, where the service path and protection path activation type is used by the end node of the protection path to activate at least one forwarding relationship of the forwarding relationship of the service path in the end node and the forwarding relationship of the protection path in the end node according to the service path and protection path activation type; and when it is determined that a fault occurs in the service path, the end node of the protection path updates the at least one forwarding relationship of the forwarding relationship of the service path in the end node and the forwarding relationship of the protection path in the end node according to the service path and protection path activation type, where the protection path is a standby path for protecting a path between specified nodes on the service path.

Beneficial effects of the embodiments of the present invention include: in the service path protection method, the controller, the device, and the system that are provided in the embodiments of the present invention, an end node of a protection path receives a path selection instruction sent by an SDN controller, where the path selection instruction includes a service path and protection path activation type, a forwarding relationship of a service path in the end node, and a forwarding relationship of the protection path in the end node; the end node of the protection path activates at least one forwarding relationship of the forwarding relationship of the service path in the end node and the forwarding relationship of the protection path in the end node according to the service path and protection path activation type; and when it is determined that a fault occurs in the service path, the end node of the protection path updates the at least one forwarding relationship of the forwarding relationship of the service path in the end node and the forwarding relationship of the protection path in the end node according to the service path and protection path activation type. A forwarding relationship, of a path indicated in the activation type, in the end node is activated according to the activation type in the path selection instruction, and when a fault occurs in the service path, the at least one forwarding relationship of the forwarding relationship of the service path in the end node and the forwarding relationship of the protection path in the end node is updated according to the activation type, so that the protection path can be used in time for data transmission, and a problem that in an SDN technology, when a fault occurs in a service path, a protection path cannot be used to protect the service path is resolved.

DETAILED DESCRIPTION

Embodiments of the present invention provide a service path protection method, a controller, a device and a system. The following describes exemplary embodiments of the present invention with reference to the accompanying drawings. It should be understood that, the exemplary embodiments described herein are merely used to illustrate and explain the present invention, rather than limiting the present invention. Moreover, in a case in which no conflict occurs, the embodiments in the application and the features in the embodiments may be mutually combined.

Figure 1:
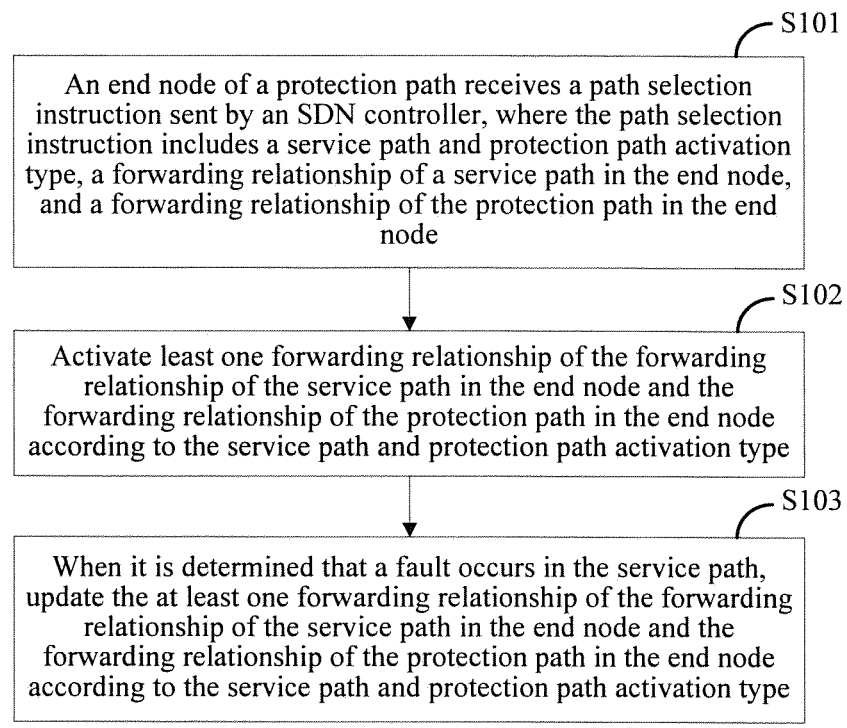
FIG. 1 is a flowchart of a service path protection method applied to a side of an end node of a protection path according to an embodiment of the present invention.

An embodiment of the present invention provides a service path protection method, applied to a side of an end node of a protection path. As shown in FIG. 1, the method specifically includes the following steps:

S101: The end node of the protection path receives a path selection instruction sent by an SDN controller, where the path selection instruction includes a service path and protection path activation type, a forwarding relationship of the service path in the end node, and a forwarding relationship of the protection path in the end node.

S102: Activate at least one forwarding relationship of the forwarding relationship of the service path in the end node and the forwarding relationship of the protection path in the end node according to the service path and protection path activation type.

S103: When it is determined that a fault occurs in the service path, update the at least one forwarding relationship of the forwarding relationship of the service path in the end node and the forwarding relationship of the protection path in the end node according to the service path and protection path activation type, where the protection path is a standby path for protecting a path between specified nodes on the service path.

Further, in step S101, the forwarding relationship of the service path in the end node may be an ingress port and an egress port that the service path passes through in the end node, and the forwarding relationship of the protection path in the end node may be an ingress port and an egress port that the protection path passes through in the end node.

Further, the specified nodes in this embodiment may be nodes on intersections of a service path and a protection path, in other words, end nodes of the protection path. The end node of the protection path in this embodiment may be a source node of the protection path (that is, a node sending a data packet in two ends of the protection path), or may also be a sink node of the protection path (that a node receiving a data packet in the two ends of the protection path). The end node may be used as a source node of a protection path of one service and a sink node of a protection path of another service at the same time. For a bi-directional transmission service, the end node is used as both a source node of a protection path of the bi-directional service and a sink node of the protection path of the bi-directional service. This embodiment describes a method for protecting, when a node is a source node or sink node of a protection path of a service, a service path of the service.

Figure 2:
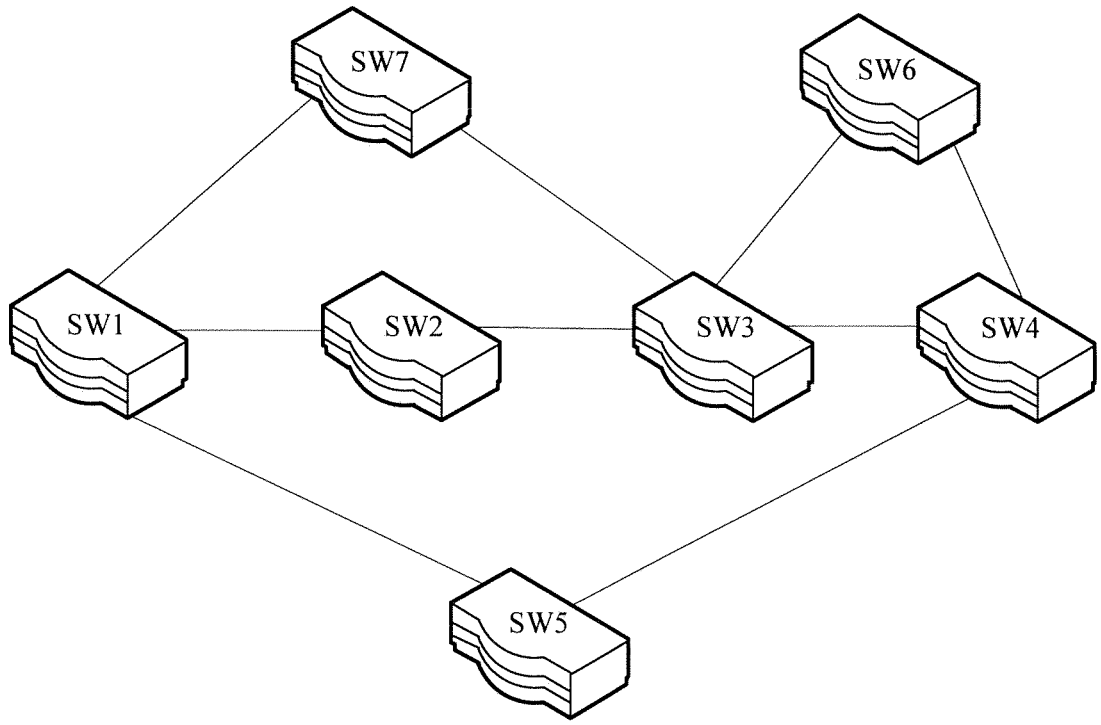
FIG. 2 is a schematic diagram showing device connection in an SDN domain according to an embodiment of the present invention.

Further, the specified nodes in this embodiment may be end nodes of the service path, or may also be intermediate nodes of the service path. That is, the protection path of the service path may be a protection path set for an entire path of the service path, or may also be a protection path set for the service path between the specified nodes on the service path, or may also be a protection path for a specified node. For example, as shown in FIG. 2, there are nodes: SW1, SW2, SW3, and SW4 in an SDN domain administrated by the SDN controller, and the four nodes form a service path: SW1-SW2-SW3-SW4, that is, there are links between SW1 and SW2, between SW2 and SW3, and between SW3 and SW4. A protection path of the service path may be a protection path for an entire path, for example, a path SW1-SW5-SW4, and in this case, the specified nodes are SW1 and SW4; or may be a protection path for a link between specified nodes SW3 and SW4 on the service path, for example, a path SW3-SW6-SW4, and in this case, the specified nodes are SW3 and SW4; or may also be a protection path for a specified node SW2 on the service path, for example, a path SW1-SW7-SW3, and in this case, the specified nodes are SW1 and SW3.

Corresponding to the method shown in FIG. 1, an embodiment of the present invention provides a service path protection method, applied to a side of an SDN controller, and specifically including the following steps:

Step 1: For an end node of a protection path, send a path selection instruction to the end node of the protection path, where the path selection instruction includes a service path and protection path activation type, a forwarding relationship of a service path in the end node, and a forwarding relationship of the protection path in the end node.

The service path and protection path activation type is used by the end node of the protection path to activate at least one forwarding relationship of the forwarding relationship of the service path in the end node and the forwarding relationship of the protection path in the end node according to the service path and protection path activation type.

When it is determined that a fault occurs in the service path, the end node of the protection path updates the at least one forwarding relationship of the forwarding relationship of the service path in the end node and the forwarding relationship of the protection path in the end node according to the service path and protection path activation type, where the protection path is a standby path for protecting a path between specified nodes on the service path.

Further, before step 1, the method may further include: determining, according to a determined service path and a protection path corresponding to a path between specified nodes on the service path, nodes that are included in the service path and the protection path.

Further, in this embodiment, involved nodes separately are a source node and a sink node of the protection path in the specified nodes. The source node and the sink node of the protection path can determine whether a transmission path of a data packet is the service path and/or the protection path.

Figure 3:
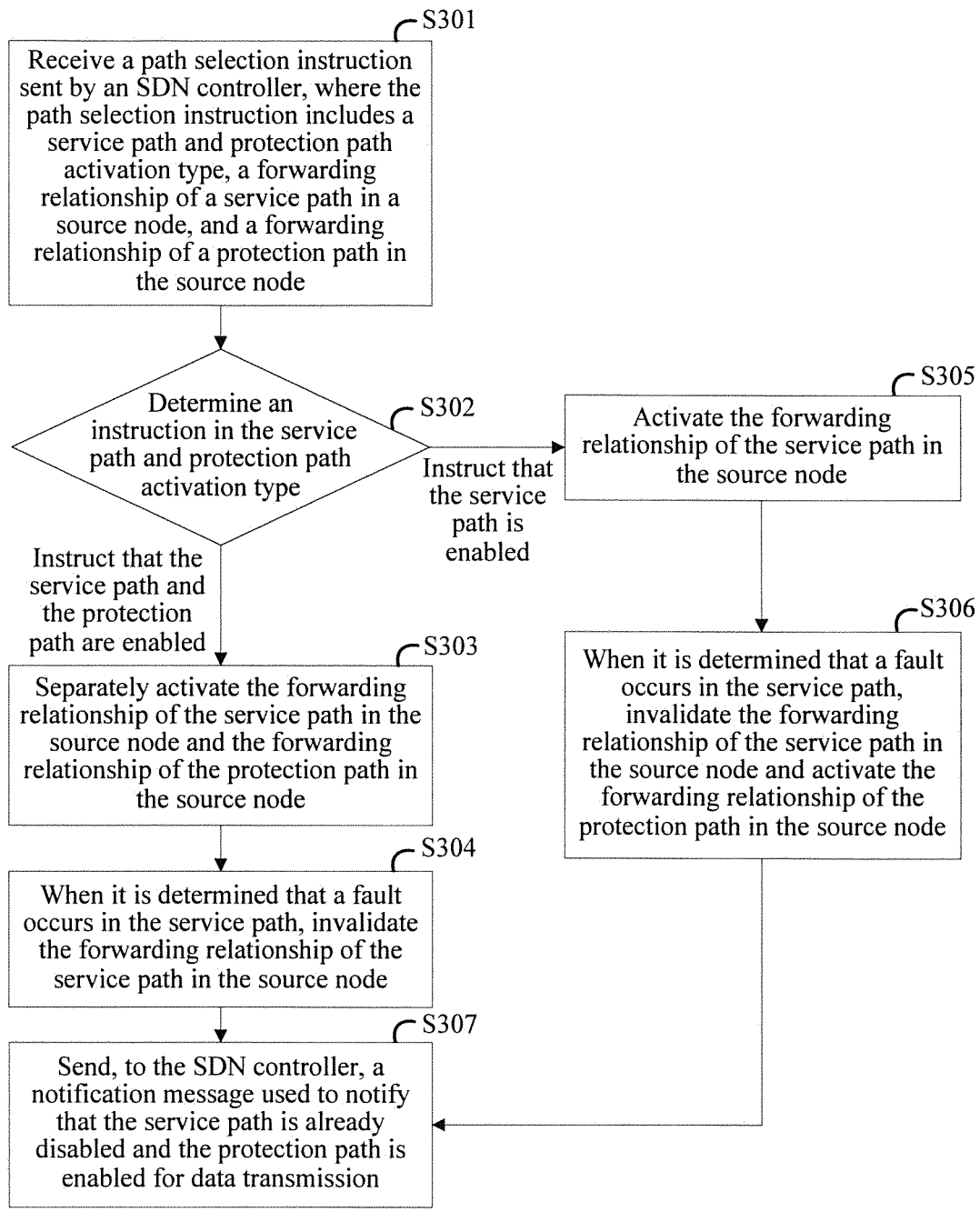
FIG. 3 is a flowchart of a service path protection method applied to a side of a source node of a protection path according to an embodiment of the present invention.

FIG. 3 shows a service path protection method according to an embodiment of the present invention, applied to aside of a source node of a protection path, and specifically including the following steps:

S301: Receive a path selection instruction sent by an SDN controller, where the path selection instruction includes a service path and protection path activation type, a forwarding relationship of a service path in a source node, and a forwarding relationship of a protection path in the source node.

S302: When the service path and protection path activation type is used to instruct the source node to enable the service path and the protection path, enter step S303; or when the service path and protection path activation type is used to instruct the source node to enable the service path, enter step S305.

Further, for an ingress port and an egress port that a path whose forwarding relationship is activated passes through in the source node, when the source node receives service data from the ingress port, the source node forwards the received data from the egress port, that is, the ingress port and the egress port form an internal path that the data passes through in the source node. Each internal path in the node may correspond to an external path between different nodes.

Further, when an activation type requested by a specified service from the SDN controller is 1+1 protection, the activation type may be used to instruct that a service path and a protection path are enabled to perform data transmission for the specified service; or when an activation type requested by a specified service from the SDN controller is 1:1 protection, the activation type may be used to instruct that a service path is enabled to perform data transmission for the specified service, and a protection path is not enabled temporarily until a fault occurs in the service path; or when an activation type requested by a specified service from the SDN controller is m:n protection, the activation type may be used to instruct that a service path is enabled to perform data transmission for the specified service.

Further, the node in this embodiment may be any device administrated by the SDN controller.

S303: Separately activate the forwarding relationship of the service path in the source node and the forwarding relationship of the protection path in the source node.

S304: When it is determined that a fault occurs in the service path, invalidate the forwarding relationship of the service path in the source node, and enter step S307.

S305: Activate the forwarding relationship of the service path in the source node.

S306: When it is determined that a fault occurs in the service path, invalidate the forwarding relationship of the service path in the source node, activate the forwarding relationship of the protection path in the source node, and enter step S307.

S307: Send, to the SDN controller, a notification message used to notify the SDN controller that the service path is already disabled and the protection path is enabled for data transmission.

Further, when a fault occurs in a path between specified nodes on the service path and the service path and protection path activation type is used to instruct the source node to enable the service path and the protection path, that is, when the activation type is used to instruct the source node to use the service path and the protection path to perform data transmission for a specified service, in step S303, the forwarding relationship of the protection path in the source node is already activated, so that even if a fault occurs in the path between the specified nodes on the service path, after an ingress port corresponding to the protection path receives data of the specified service, the data may still be forwarded from an egress port, where a forwarding relationship is established between the ingress port and the egress port; or when the activation type is used to instruct the source node to enable the service path, that is, when the activation type is used to instruct the source node to use the service path to perform data transmission for the specified service and temporarily not to use the protection path to perform data transmission for the specified service, when a fault occurs in a path between specified nodes on the service path, the forwarding relationship of the protection path in the source node needs to be activated, so that the protection path is enabled to replace the service path to perform data transmission for the specified service.

Figure 4:
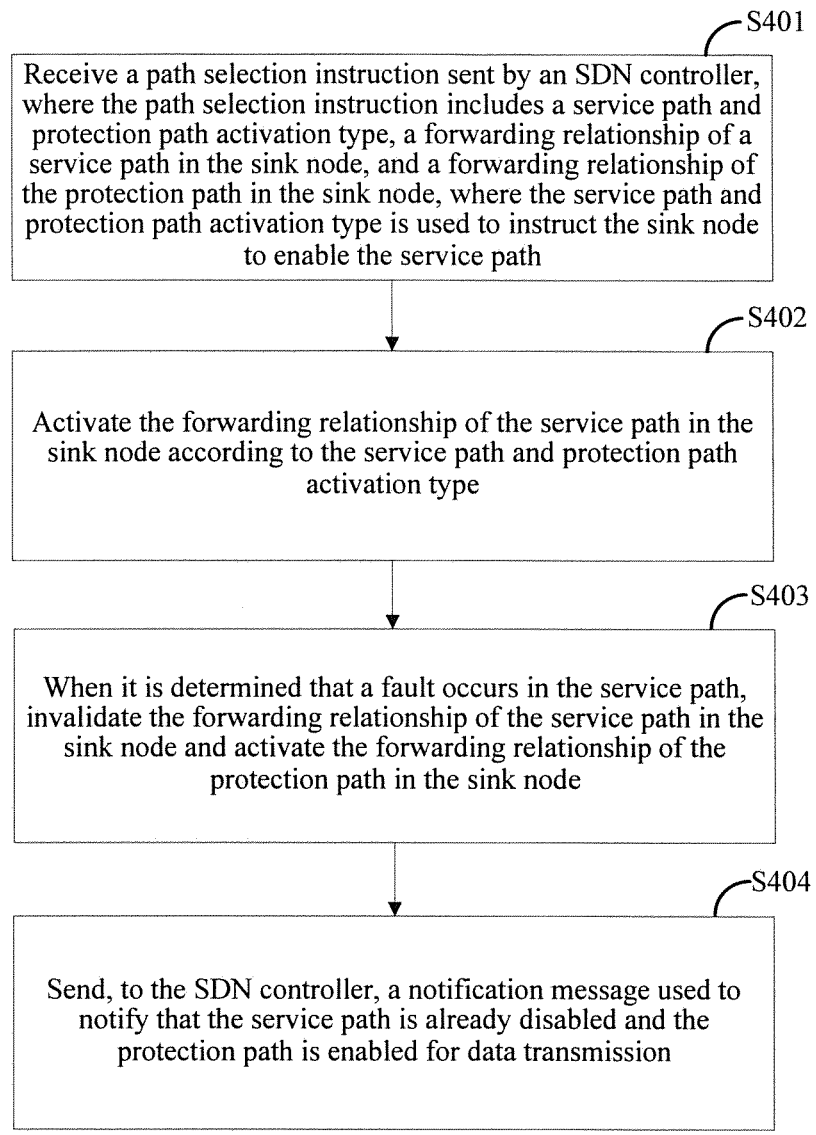
FIG. 4 is a flowchart of a service path protection method applied to a side of a sink node of a protection path according to an embodiment of the present invention.

FIG. 4 shows a service path protection method according to an embodiment of the present invention, applied to a side of a sink node of a protection path, and specifically including the following steps:

S401: Receive a path selection instruction sent by an SDN controller, where the path selection instruction includes a service path and protection path activation type, a forwarding relationship of a service path in the sink node, and a forwarding relationship of the protection path in the sink node, where the service path and protection path activation type is used to instruct the sink node to enable the service path.

S402: Activate the forwarding relationship of the service path in the sink node according to the service path and protection path activation type.

Further, when an activation type requested by a specified service from the SDN controller is 1+1 protection, or when an activation type requested by a specified service from the SDN controller is 1:1 protection, or when an activation type requested by a specified service from the SDN controller is m:n protection, for the sink node of the protection path, the activation type may be used to instruct that the service path is enabled to perform data transmission for the specified service, and the protection path is not enabled temporarily until a fault occurs in the service path. For a device used as the sink node of the protection path, because the device cannot receive the same data from two channels, the device may receive data by using one of the path of the service path and the protection path that transmit the same data. Therefore, during activation of the forwarding relationships of the service path and the corresponding protection path in the sink node, only the forwarding relationship of the service path in the sink node needs to be activated, the forwarding relationship of the protection path in the sink node is not activated temporarily, and when a fault occurs in the service path, the protection path is enabled to protect the service path.

Further, the node in this embodiment may be any device administrated by the SDN controller.

S403: When it is determined that a fault occurs in the service path, invalidate the forwarding relationship of the service path in the sink node and activate the forwarding relationship of the protection path in the sink node.

S404: Send, to the SDN controller, a notification message used to notify the SDN controller that the service path is already disabled and the protection path is enabled for data transmission.

Further, for the embodiments shown in FIG. 3 and FIG. 4, a process executed on a side of an SDN controller includes the following steps:

Step 1: For an end node of a protection path, send a path selection instruction to the end node of the protection path, where the path selection instruction includes a service path and protection path activation type, a forwarding relationship of a service path in the end node, and a forwarding relationship of the protection path in the end node.

Step 2: When a fault occurs in the service path, receive a notification message sent by the end node of the protection path which is used to notify that the service path is already disabled and the protection path is enabled to perform data transmission.

Figure 5:
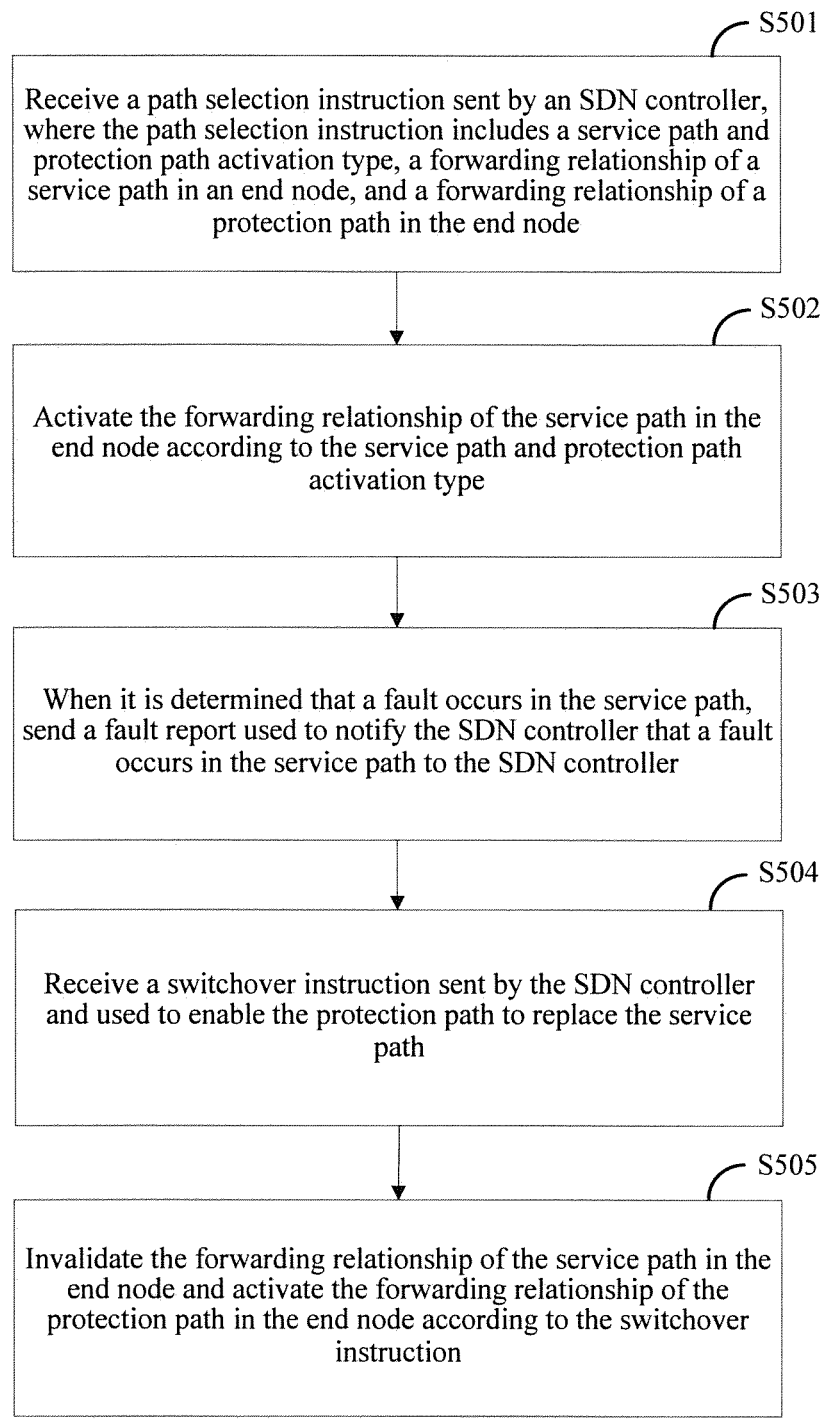
FIG. 5 is a flowchart of a service path protection method applied to a side of an end node of a protection path according to an embodiment of the present invention.

FIG. 5 shows a service path protection method according to an embodiment of the present invention, where the method is applied to a side of a sink node of a protection path and a side of a source node of the protection path, and a service path and protection path activation type is used to instruct the source node to enable a service path. Specific steps are as follows:

S501: Receive a path selection instruction sent by an SDN controller, where the path selection instruction includes a service path and protection path activation type, a forwarding relationship of the service path in an end node, and a forwarding relationship of the protection path in the end node.

S502: Activate the forwarding relationship of the service path in the end node according to the service path and protection path activation type.

S503: When it is determined that a fault occurs in the service path, send, to the SDN controller, a fault report used to notify the SDN controller that a fault occurs in the service path.

S504: Receive a switchover instruction sent by the SDN controller which is used to enable the protection path to replace the service path.

S505: Invalidate the forwarding relationship of the service path in the end node and activate the forwarding relationship of the protection path in the end node according to the switchover instruction.

Further, for the embodiment shown in FIG. 5, a process executed on a side of an SDN controller includes the following steps:

Step 1: For an end node of a protection path, send a path selection instruction to the end node of the protection path, where the path selection instruction includes a service path and protection path activation type, a forwarding relationship of a service path in the end node, and a forwarding relationship of the protection path in the end node.

Step 2: When it is determined that a fault occurs in the service path, receive a fault report sent by the end node of the protection path which is used to notify that a fault occurs in the service path.

Step 3: Send a switchover instruction used to enable the protection path to replace the service path to the end node of the protection path, where the switchover instruction is used to instruct the end node of the protection path to invalidate the forwarding relationship of the service path in the end node and activate the forwarding relationship of the protection path in the end node.

Further, using an OpenFlow protocol as an example, for the end node of the protection path, the SDN controller may send a stream mode table and a group mode table to the end node. After receiving the stream mode table and the group mode table, a device may save the stream mode table and the group mode table in the node, and configure the device itself according to instructions in the stream mode table and the group mode table.

Further, a match (Match) entry in the stream mode table may be used to represent an identifier of a specified service. An action instruction (Instruction) entry for the specified service may be an identifier of the group mode table. In the group mode table, a type (TYPE) entry of the group mode table may be used to represent an activation type (when the activation type is used to instruct that a service path is used to perform data transmission for the specified service and there are at least two service paths, the Type entry cannot be used to represent the activation type). An action bucket (ACTION_BUCKETS) entry in the group mode table may be used to represent forwarding relationships that separately correspond to a service path and a protection path, an entry corresponding to the forwarding relationship of the service path in the end node is used as an active rule entry, and an entry corresponding to the forwarding relationship of the protection path in the end node is used as a standby rule entry.

Further, an activation type instructing that a service path and a protection path are used to perform data transmission for a specified service may correspond to a mandatory all (All) type defined for the type (TYPE) entry of a group mode entry in the OpenFlow protocol, that is, all forwarding rules (that is, a forwarding rule corresponding to the service path and a forwarding rule corresponding to the protection path) in the group mode table are executed; when there is one service path, an activation type instructing that a service path is used to perform data transmission for a specified service may correspond to an optional fast protection switching (Fast Failover) type defined for the type (TYPE) entry of the group mode entry in the OpenFlow protocol, that is, the first activated forwarding rule is executed.

The following gives descriptions by using an example.

Figure 6:
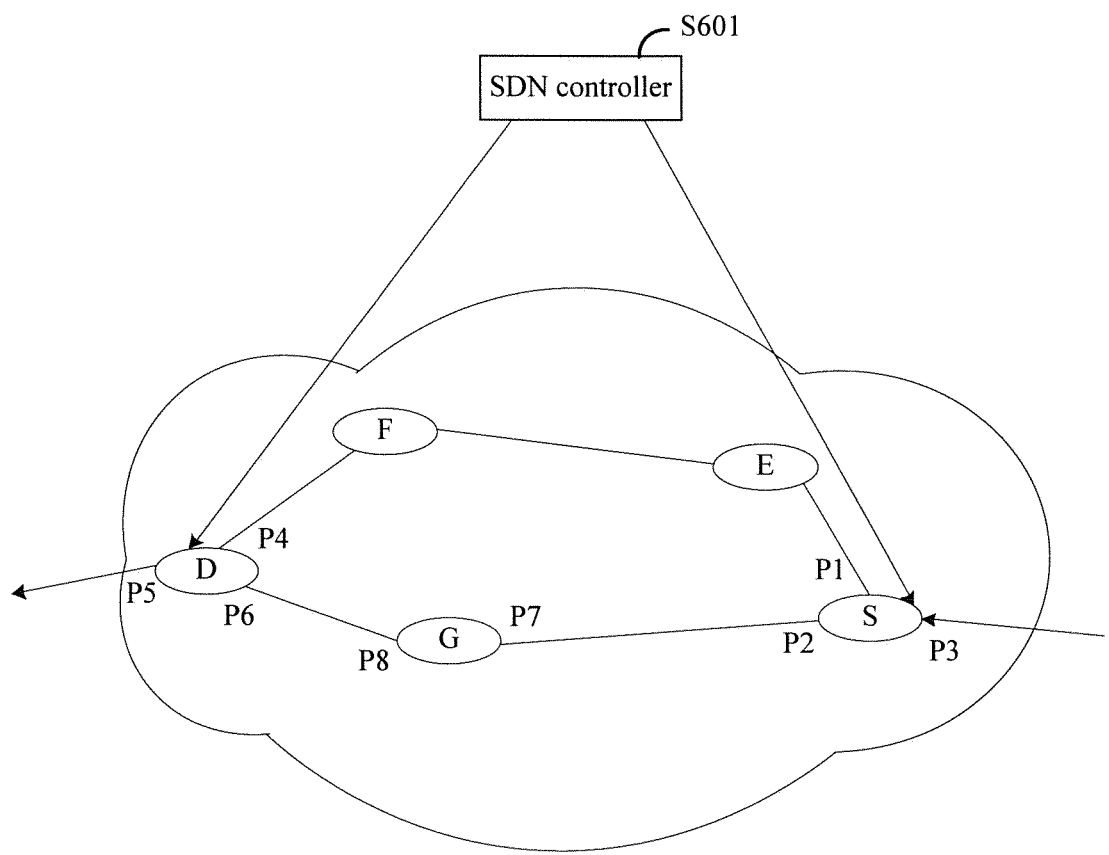
FIG. 6 is a schematic diagram showing device connection in an SDN domain according to an embodiment of the present invention.

Example 1: as shown in FIG. 6, an SDN controller 601 receives a data packet transmission request of a service 1, where a protection type is 1:1, a service path determined by the SDN controller 601 for the service 1 is S-E-F-D, a protection path is S-G-D, a device S is used as a source node of the protection path, and a device D is used as a sink node of the protection path.

For the service path S-E-F-D, an ingress port of the service path of the service 1 on the device S is P3, an egress port is P1, an ingress port on the device D is P4, and an egress port is P5; for the protection path S-G-D, an ingress port of the service path of the service 1 on the device S is P3, an egress port is P2, an ingress port on the device D is P6, and an egress port is P5.

For the device S and the device D on intersections of the service path and the protection path, the SDN controller 601 separately sends path selection instructions to the device S and the device D, where each of the path selection instructions sent to the device S and the device D includes a service path and protection path activation type of the service 1, a forwarding relationship of the service path of the service 1 in the device, and a forwarding relationship of the protection path of the service 1 in the device.

Using the OpenFlow protocol as an example, after the device S receives the path selection instruction sent by the SDN controller 601, established entries may be shown in Table 1, and after the device D receives the path selection instruction sent by the SDN controller 601, established entries may be shown in Table 2.

TABLE 1

| Stream mode entry: | |
|---|---|
| Match | Instruction |
| Service 1 | Group1 |

| Group mode entry: | | | |
|---|---|---|---|
| GID | TYPE | ACTION_BUCKETS | State |
| 1 | Fast Failover | Ingress port being P3 and egress port being P1 | Active |
| | | Ingress port being P3 and egress port being P2 | Active |

Table 1 includes a stream mode table and a group mode table that are established by the device S. In the stream mode table, content of a match (Match) entry may be an identifier of the service 1, and content of an action instruction (Instruction) entry for the service 1 may be an identifier Group1 of the group mode table. In the group mode table, content of a type (TYPE) entry represents that the activation type is executing the first activated forwarding rule, that is, activating the forwarding relationship of the service path in the device S, that is, establishing a cross for the ingress port P3 and the egress port P1 that correspond to the service path in the device S; content of an action bucket (ACTION_BUCKETS) entry includes all forwarding rules, that is, the first entry represents that the forwarding relationship of the service path in the device S is the ingress port being P3 and the egress port being P1, and the second entry represents that the forwarding relationship of the protection path in the device S is the ingress port being P3 and the egress port being P2. States may also be set for the entries, setting a state (State) to active (Active) represents that the entry is a valid entry, and when a fault occurs in the service path, the active entry rule representing the forwarding relationship of the service path may be invalidated, and then a state corresponding to active rule entry may be set to unActive (unActive), or the active rule entry is deleted.

TABLE 2

| Stream mode entry: | |
|---|---|
| Match | Instruction |
| Service 1 | Group1 |

| Group mode entry: | | | |
|---|---|---|---|
| GID | TYPE | ACTION_BUCKETS | State |
| 1 | Fast Failover | Ingress port being P4 and egress port being P5 | Active |
| | | Ingress port being P6 and egress port being P5 | Active |

Table 2 includes a stream mode table and a group mode table that are established by the device D. In the stream mode table, content of a match (Match) entry may be an identifier of the service 1, and content of an action instruction (Instruction) entry for the service 1 may be an identifier Group1 of the group mode table. In the group mode table, content of a type (TYPE) entry represents that the activation type is executing the first activated forwarding rule, that is, activating the forwarding relationship of the service path in the device D, that is, establishing a cross for the ingress port P4 and the egress port P5 that correspond to the service path in the device D; content of an action bucket (ACTION_BUCKETS) entry includes all forwarding rules, that is, the first entry represents that the forwarding relationship of the service path in the device D is the ingress port being P4 and the egress port being P5, and the second entry represents that the forwarding relationship of the protection path in the device D is the ingress port being P6 and the egress port being P5.

Further, when the protection type of the data packet transmission request received by the SDN controller 601 and of the service 1 is 1+1, after the device D receives the path selection instruction sent by the SDN controller 601, established entries may also be shown in Table 2, and after the device S receives the path selection instruction sent by the SDN controller 601, established entries may also be shown in Table 3.

TABLE 3

| Stream mode entry: | |
|---|---|
| Match | Instruction |
| Service 1 | Group1 |

| Group mode entry: | | | |
|---|---|---|---|
| GID | TYPE | ACTION_BUCKETS | State |
| 1 | All | Ingress port being P3 and egress port being P1 | Active |
| | | Ingress port being P3 and egress port being P2 | Active |

In the group mode table shown in Table 3, content of a type (TYPE) entry represents that the activation type is executing all activated forwarding rules, that is, activating the forwarding relationship of the service path in the device S and the forwarding relationship of the protection path in the device S, that is, establishing a cross for the ingress port P3 and the egress port P1 and establishing a cross for the ingress port P3 and the egress port P2.

Figure 7:
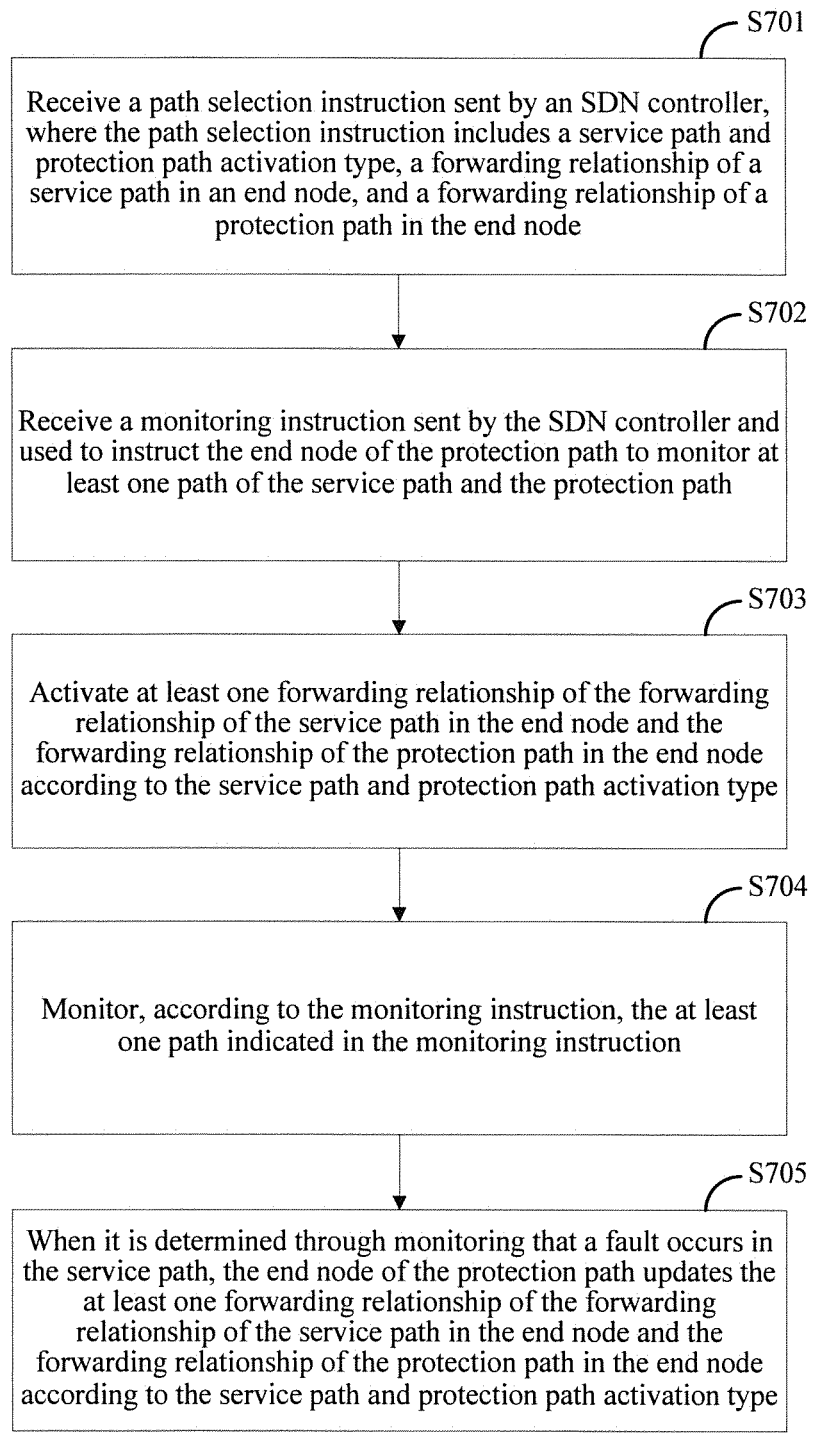
FIG. 7 is a flowchart of a service path protection method applied to a side of an end node of a protection path according to an embodiment of the present invention.

FIG. 7 shows a service path protection method according to an embodiment of the present invention, applied to a side of an end node of a protection path, and specifically including the following steps:

S701: Receive a path selection instruction sent by an SDN controller, where the path selection instruction includes a service path and protection path activation type, a forwarding relationship of a service path in the end node, and a forwarding relationship of the protection path in the end node.

S702: Receive a monitoring instruction sent by the SDN controller which is used to instruct the end node of the protection path to monitor at least one path of the service path and the protection path.

In this step, the monitoring instruction may be used to instruct, according to actual requirements, the end node to monitor the service path, or the protection path, or the service path and the protection path.

Further, in this step, the monitoring instruction may include a monitoring protocol used to instruct the end node, and corresponding configuration information of the protocol, and the monitoring the at least one path indicated in the monitoring instruction may be: monitoring service data transmission on the path, and/or monitoring a physical link of the path.

S703: Activate at least one forwarding relationship of the forwarding relationship of the service path in the end node and the forwarding relationship of the protection path in the end node according to the service path and protection path activation type.

Further, in this embodiment, the monitoring instruction may be sent after the SDN controller sends the path selection instruction in S701; therefore, there is no strict sequence for execution of step S702 and step S703.

S704: Monitor, according to the monitoring instruction, the at least one path indicated in the monitoring instruction.

Further, in the prior art, two protocols need to be used to monitor a path, that is, the operation, administration and maintenance (OAM) protocol and the link management protocol (LMP), where the OAM protocol is generally used to monitor a service data transmission status between a user network and an operator network, and the LMP protocol is mainly used to detect continuity of a physical link between adjacent nodes. In the prior art, generally, the OAM protocol and the LMP protocol need to be combined to discover a transmission fault, for service data of a service, on a monitored path, and fault monitoring is not performed independently on a physical link corresponding to a path transmitting the service.

Further, in this embodiment of the present invention, a physical link corresponding to the service path may be directly monitored, and monitoring is not performed on the link from the perspective of service transmission. When a fault occurs in the physical link, it may be determined that faults occurs in all service paths carried on the physical link, and then, protection paths may be enabled separately for the service paths carried on the physical link.

Further, in this embodiment of the present invention, for a case in which the protection path of the service path may be a protection path set for a service path between specified nodes on the service path, and the protection path of the service path is a protection path for a specified device, for example, in FIG. 2, for the protection path for a link between specified nodes SW3 and SW4 on the service path, for example, a path SW3-SW-6-SW4, and for the protection path for a specified device SW2 on the service path, for example, a path SW1-SW7-SW3, fault detection may be performed by using the LMP protocol, that is, when a fault occurs in a physical link between adjacent nodes on the service path, the protection path is enabled to protect the service path carried on the faulty physical link.

S705: When it is determined through monitoring that a fault occurs in the service path, the end node of the protection path updates the at least one forwarding relationship of the forwarding relationship of the service path in the end node and the forwarding relationship of the protection path in the end node according to the service path and protection path activation type.

Further, in this embodiment of the present invention, a source node of the protection path and a sink node of the protection path both need to monitor the at least one path indicated in the monitoring instruction. When a fault occurs in the service path, the source node of the protection path and the sink node of the protection path can separately discover a fault of the service path, and when a source node and a sink node are automatically switched to the source node and the sink node of the protection path, the switching to the protection path succeeds.

Further, for the embodiment shown in FIG. 7, a process executed on a side of an SDN controller includes the following steps:

Step 1: For an end node of a protection path, send a path selection instruction to the end node of the protection path, where the path selection instruction includes a service path and protection path activation type, a forwarding relationship of a service path in the end node, and a forwarding relationship of the protection path in the end node.

Step 2: Send a monitoring instruction used to instruct the end node of the protection path to monitor at least one path of the service path and the protection path to the end node of the protection path.

Figure 8:
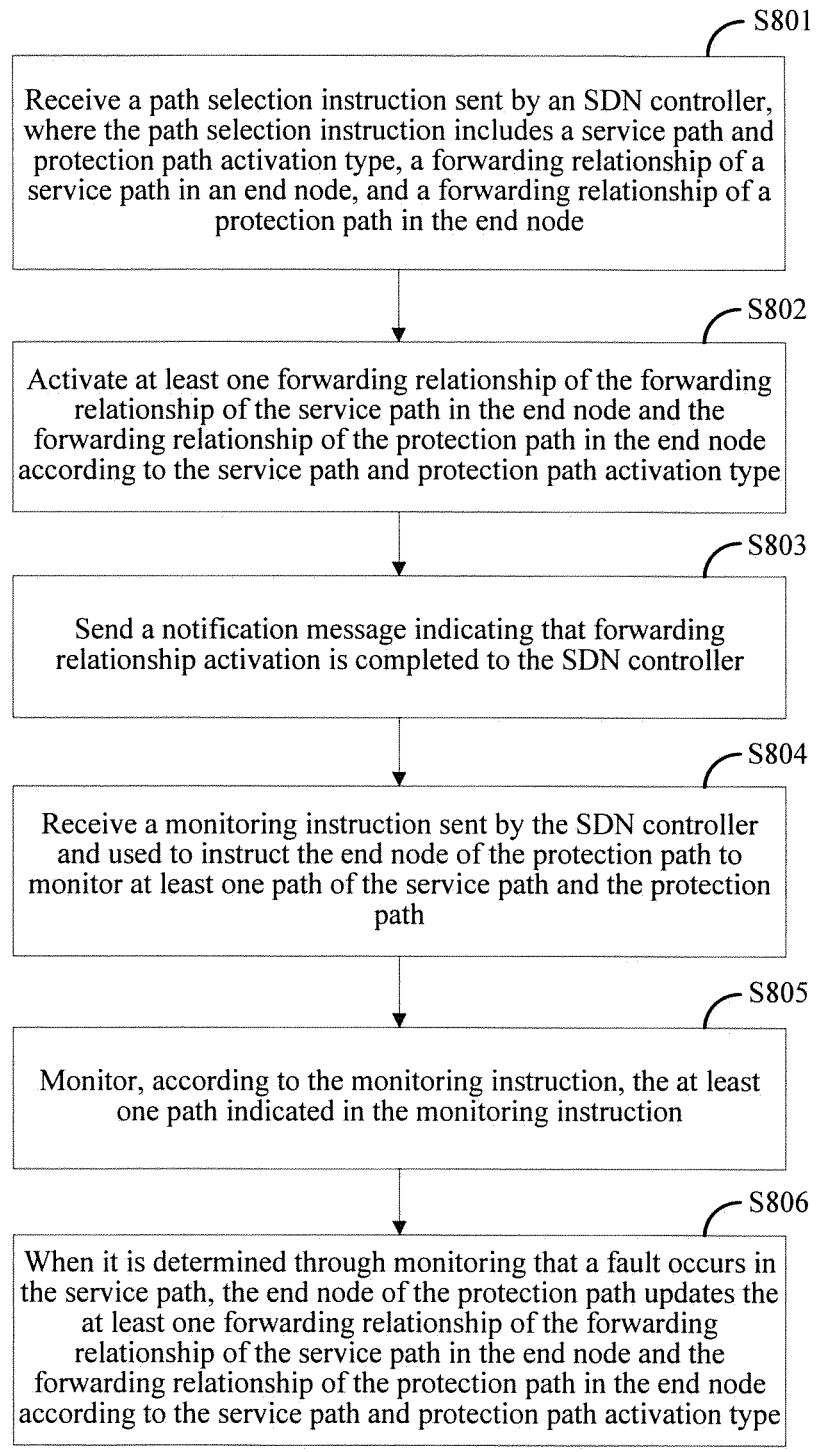
FIG. 8 is a flowchart of a service path protection method applied to a side of an end node of a protection path according to an embodiment of the present invention.

FIG. 8 shows a service path protection method according to an embodiment of the present invention, applied to a side of an end node of a protection path, and specifically including the following steps:

S801: Receive a path selection instruction sent by an SDN controller, where the path selection instruction includes a service path and protection path activation type, a forwarding relationship of a service path in the end node, and a forwarding relationship of the protection path in the end node.

S802: Activate at least one forwarding relationship of the forwarding relationship of the service path in the end node and the forwarding relationship of the protection path in the end node according to the service path and protection path activation type.

S803: Send a notification message indicating that forwarding relationship activation is completed to the SDN controller.

S804: Receive a monitoring instruction sent by the SDN controller and used to instruct the end node of the protection path to monitor at least one path of the service path and the protection path.

In this step, the monitoring instruction may be used to instruct, according to actual requirements, the end node to monitor the service path, or the protection path, or the service path and the protection path.

Further, in this step, the monitoring instruction may include a monitoring protocol used to instruct the end node, and corresponding configuration information of the protocol, and the monitoring the at least one path indicated in the monitoring instruction may be: monitoring service data transmission on the path, and/or monitoring a physical link of the path.

S805: Monitor, according to the monitoring instruction, the at least one path indicated in the monitoring instruction.

S806: When it is determined through monitoring that a fault occurs in the service path, the end node of the protection path updates the at least one forwarding relationship of the forwarding relationship of the service path in the end node and the forwarding relationship of the protection path in the end node according to the service path and protection path activation type.

Further, for the embodiment shown in FIG. 8, a process executed on a side of an SDN controller includes the following steps:

Step 1: For an end node of a protection path, send a path selection instruction to the end node of the protection path, where the path selection instruction includes a service path and protection path activation type, a forwarding relationship of a service path in the end node, and a forwarding relationship of the protection path in the end node.

Step 2: Receive a notification message sent by the end node of the protection path and indicating that forwarding relationship activation is completed.

Step 3: Send a monitoring instruction used to instruct the end node of the protection path to monitor at least one path of the service path and the protection path to the end node of the protection path.

The following gives descriptions by using an example.

Figure 9:
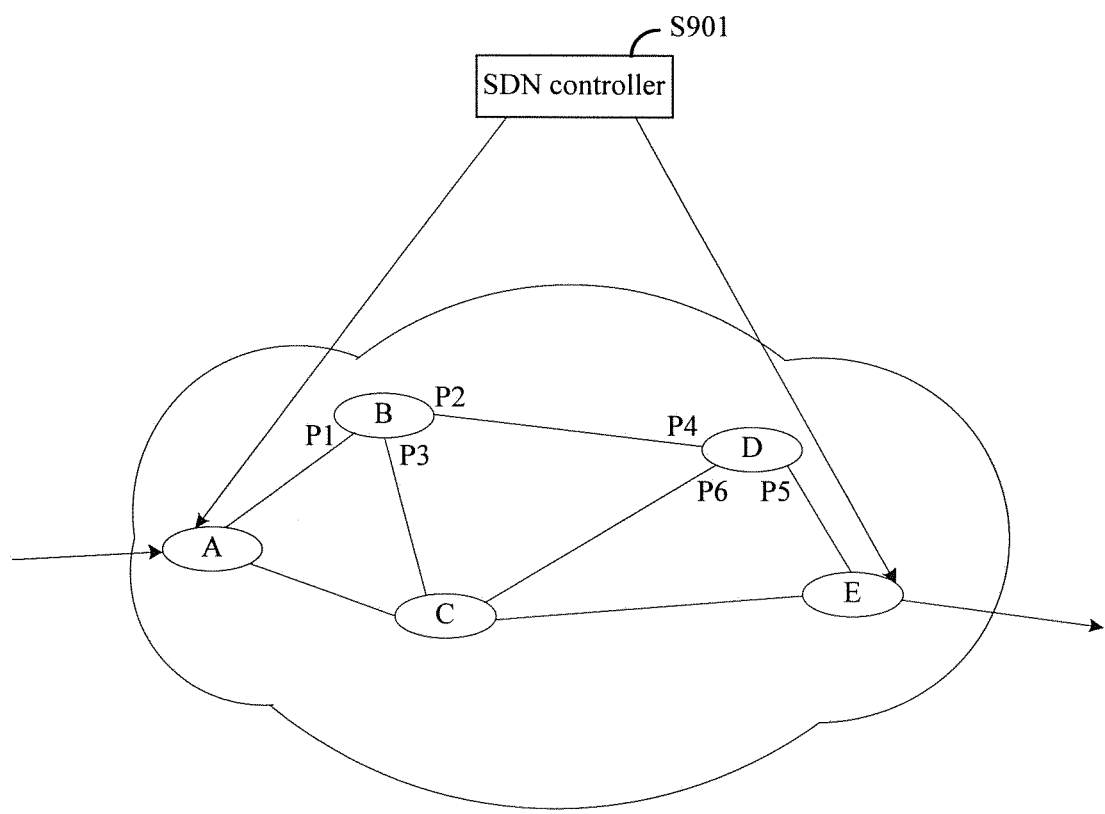
FIG. 9 is a schematic diagram showing device connection in an SDN domain according to an embodiment of the present invention.

Example 2, as shown in FIG. 9, an SDN controller 901 receives a data packet transmission request of a service 2, where a protection type is FRR protection for a specified link, a service path determined by the SDN controller 901 for the service 2 is A-B-D-E, a protection path is B-C-D, a device B is used as a source node of the protection path, and a device D is used as a sink node of the protection path.

For the service path, an ingress port of the service path of the service 2 on the device B is P1, an egress port is P2, an ingress port on the device D is P4, and an egress port is P5; for the protection path, an ingress port of the protection path of the service 2 on the device B is P1, an egress port is P3, an ingress port on the device D is P6, and an egress port is P5.

For the device B and the device D on intersections of the service path and the protection path, the SDN controller 901 separately sends path selection instructions to the device B and the device D, where each of the path selection instructions sent to the device B and the device D includes a service path and protection path activation type of the service 2, a forwarding relationship of the service path of the service 2 in the device, and a forwarding relationship of the protection path of the service 2 in the device. The SDN controller 901 further sends the monitoring instructions to the device B and the device D, to instruct the devices to monitor paths indicated in the monitoring instructions.

Using an OpenFlow protocol as an example, after the device B receives the path selection instruction sent by the SDN controller 901, established entries may be shown in Table 4, and after the device D receives the path selection instruction sent by the SDN controller 901, established entries may be shown in Table 5.

TABLE 4

| Stream mode entry: | |
| --- | --- |
| Match | Instruction |
| Service 2 | Group2 |

| Group mode entry: | | | | |
| --- | --- | --- | --- | --- |
| GID | TYPE | ACTION_BUCKETS | | State |
| 2 | Fast Failover | Watch_port, ingress port being P1 and egress port being P2 | | Active |
| | | Watch_port, ingress port being P1 and egress port being P3 | | Active |

Table 4 includes a stream mode table and a group mode table that are established by the device B. In the stream mode table, content of a match (Match) entry may be an identifier of the service 2, and content of an action instruction (Instruction) entry for the service 2 may be an identifier Group2 of the group mode table. In the group mode table, content of a type (TYPE) entry represents that the forwarding relationship type is executing the first activated forwarding rule, that is, activating the forwarding relationship of the service path in the device B, that is, establishing a cross for the ingress port P1 and the egress port P2 that correspond to the service path in the device B; content of an action bucket (ACTION_BUCKETS) entry includes all forwarding rules, that is, the first entry represents that the forwarding relationship of the service path in the device B is the ingress port being P1 and the egress port being P2, and the second entry represents that the forwarding relationship of the protection path in the device B is the ingress port being P1 and the egress port being P3. The Watch_port identifier in the action bucket (ACTION_BUCKETS) entry represents monitoring a path represented by an entry having the identifier. In this example, the device B needs to monitor both the service path and the protection path. A specific monitoring manner may be: sending an LMP data packet to an adjacent node of the device B.

TABLE 5

| Stream mode entry: | |
| --- | --- |
| Match | Instruction |
| Service 2 | Group2 |

| Group mode entry: | | | | |
| --- | --- | --- | --- | --- |
| GID | TYPE | ACTION_BUCKETS | | State |
| 2 | Fast Failover | Watch_port, ingress port being P4 and egress port being P5 | | Active |
| | | Watch_port, ingress port being P6 and egress port being P5 | | Active |

Table 5 includes a stream mode table and a group mode table that are established by the device D. In the stream mode table, content of a match (Match) entry may be an identifier of the service 2, and content of an action instruction (Instruction) entry for the service 2 may be an identifier Group2 of the group mode table. In the group mode table, content of a type (TYPE) entry represents that the activation type is executing the first activated forwarding rule, that is, activating the forwarding relationship of the service path in the device D, that is, establishing a cross for the ingress port P4 and the egress port P5 that correspond to the service path in the device D; content of an action bucket (ACTION_BUCKETS) entry includes all forwarding rules, that is, the first entry represents that the forwarding relationship of the service path in the device D is the ingress port being P4 and the egress port being P5, and the second entry represents that the forwarding relationship of the protection path in the device D is the ingress port being P6 and the egress port being P5. The Watch_port identifier in the action bucket (ACTION_BUCKETS) entry represents monitoring a path represented by an entry having the identifier. In this example, the device D needs to monitor both the service path and the protection path. A specific monitoring manner may be: sending an LMP data packet to an adjacent node of the device D.

Figure 10:
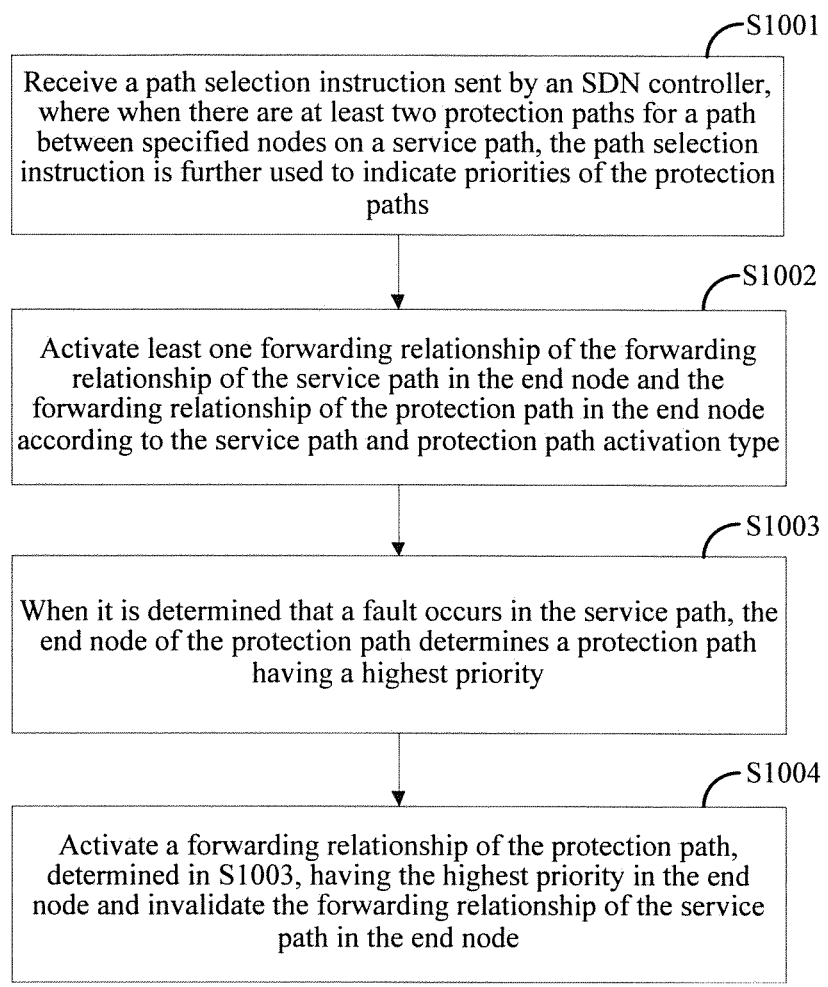
FIG. 10 is a flowchart of a service path protection method applied to a side of an end node of a protection path according to an embodiment of the present invention.

FIG. 10 shows a service path protection method according to an embodiment of the present invention, where the method is applied to a side of a sink node of a protection path and a side of a source node of the protection path, and a service path and protection path activation type is used to instruct the source node to enable a service path. Specific steps are as follows:

S1001: Receive a path selection instruction sent by an SDN controller, where the path selection instruction includes a service path and protection path activation type, a forwarding relationship of the service path in an end node, and a forwarding relationship of the protection path in the end node, and when there are at least two protection paths for a path between specified nodes on the service path, the path selection instruction is further used to indicate priorities of the protection paths.

S1002: Activate at least one forwarding relationship of the forwarding relationship of the service path in the end node and the forwarding relationship of the protection path in the end node according to the service path and protection path activation type.

S1003: When it is determined that a fault occurs in the service path, the end node of the protection path determines a protection path having a highest priority.

S1004: Activate a forwarding relationship of the protection path, determined in S1003, having the highest priority in the end node and invalidate the forwarding relationship of the service path in the end node.

Further, in an actual application, there may also be multiple service paths. Using an OpenFlow protocol as an example, in a group mode table, correspondingly, there may be multiple active rule entries, separately corresponding to forwarding relationships of the multiple service paths in a device. Identifiers may be separately established for the active rule entries, where each of the entries is used to represent a service identifier of the service path; or, a service path counting entry may be established, where a value of the counting entry represents that a quantity of consecutive entries in the group mode table are active rule entries. For priorities of multiple protection paths in the group mode entry, a priority identifier may be added for each standby rule entry, or a sequence of the standby rule entry in the group mode table may be used to represent a priority of the rule entry, for example, the first standby rule entry is an entry having a highest priority, and the following standby rule entries are arranged in descending order of priority.

The following gives descriptions by using an example.

Figure 11:
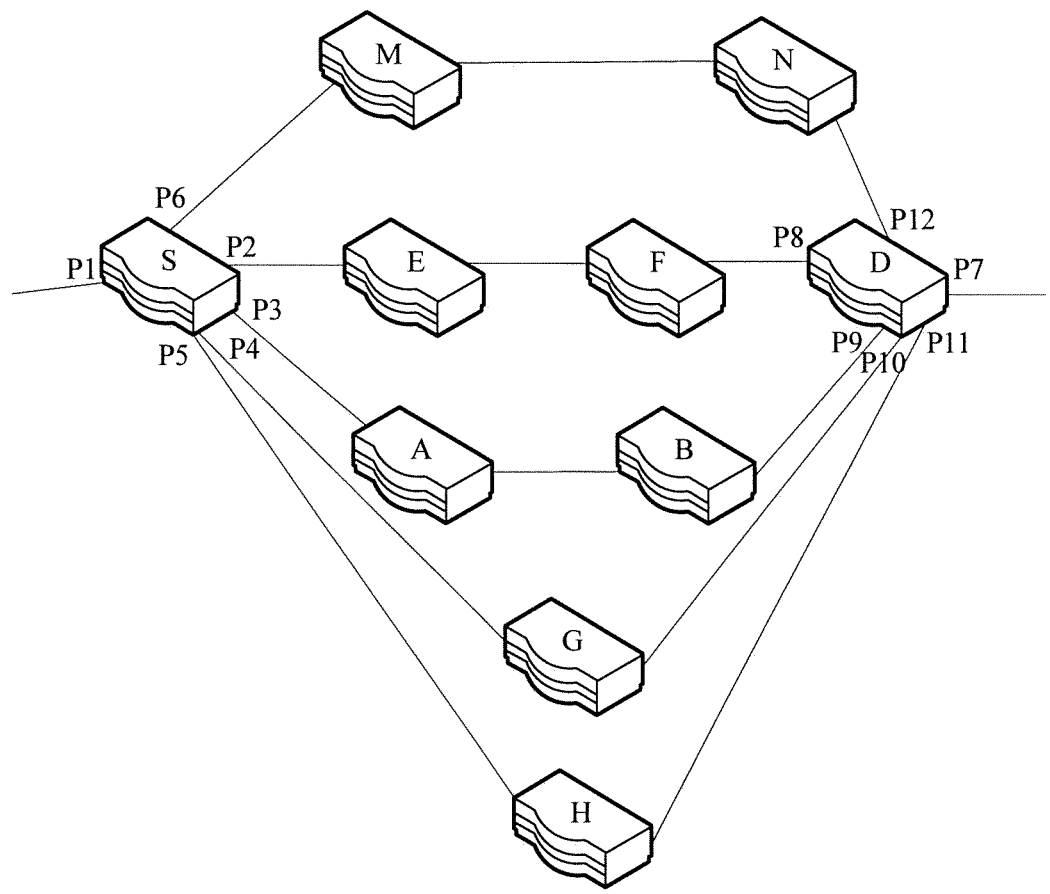
FIG. 11 is a schematic diagram showing device connection in an SDN domain according to an embodiment of the present invention.

Example 3: As shown in FIG. 11, the SDN controller receives a data packet transmission request of a service 3, where a protection type is 3:2, that is, three protection paths are allocated for two service paths. Two service paths determined by the SDN controller for the service 3 are S-E-F-D and S-A-B-D, and three protection paths are S-G-D, S-H-D, and S-M-N-D, where source nodes of the protection paths are a device S and sink nodes of the protection paths are a device D.

For the service path S-E-F-D, an ingress port of the data packet of the service 3 on the device S is P1, an egress port is P2, an ingress port on the device D is P8, and an egress port is P7; for the service path S-A-B-D, an ingress port of the data packet of the service 3 on the device S is P1, an egress port is P3, an ingress port on the device D is P9, and an egress port is P7.

For the protection path S-G-D, an ingress port of the data packet of the service 3 on the device S is P1, an egress port is P4, an ingress port on the device D is P10, and an egress port is P7; for the protection path S-H-D, an ingress port of the data packet of the service 3 on the device S is P1, an egress port is P5, an ingress port on the device D is P11, and an egress port is P7; for the protection path S-M-N-D, an ingress port of the data packet of the service 3 on the device S is P1, an egress port is P6, an ingress port on the device D is P12, and an egress port is P7.

For the device S and the device D on intersections of the service path and the protection path, the SDN controller separately sends path selection instructions to the device S and the device D, where each of the path selection instructions sent to the device S and the device D includes a service path and protection path activation type of the service 3, a forwarding relationship of the service path of the service 3 in the device, and a forwarding relationship of the protection path of the service 3 in the device.

Using an OpenFlow protocol as an example, after the device S receives the path selection instruction sent by the SDN controller, established entries may be shown in Table 6; and after the device D receives the path selection instruction sent by the SDN controller, established entries may be shown in Table 7.

TABLE 6

| Stream mode entry: | |
|---|---|
| Match | Instruction |
| Service 3 | Group3 |

| Group mode entry: | | | |
|---|---|---|---|
| GID | TYPE | ACTION_BUCKETS | State |
| 3 | Main | Ingress port being P1 and egress port being P2, m | Active |
| | | Ingress port being P1 and egress port being P3, m | Active |
| | | Ingress port being P1 and egress port being P4, 2 | Active |
| | | Ingress port being P1 and egress port being P5, 1 | Active |
| | | Ingress port being P1 and egress port being P6, 3 | Active |

Table 6 includes a stream mode table and a group mode table that are established by the device S. In the stream mode table, content of a match (Match) entry may be an identifier of the service 3, and content of an action instruction (Instruction) entry for the service 3 may be an identifier Group3 of the group mode table. In the group mode table, content of a type (TYPE) entry represents that an activation type is executing an active forwarding rule (which is not defined in the OpenFlow protocol, but is self-defined), that is, activating the forwarding relationships of all service paths in the device S, that is, establishing a cross for the ingress port P1 and the egress port P2 and establishing a cross for the ingress port P1 and the egress port P3. Content of an action bucket (ACTION_BUCKETS) entry includes all forwarding rules, that is, the first two entries represent the forwarding relationships of the service paths in the device S, and the latter three entries represent the forwarding relationships of the protection paths in the device S. The identifier m in the action bucket (ACTION_BUCKETS) entry represents that an entry having the identifier is an active rule entry, and a number identifier in the action bucket (ACTION_BUCKETS) entry represents a priority of a standby rule entry having the identifier, that is, when a fault occurs in a service path represented by any one of the active rule entries, it is determined according to the priorities of the standby rule entries that a protection path represented by a standby rule entry having a highest priority is used to replace the faulty service path to forward the received data packet of the service 3. In this example, the standby path having the highest priority is S-H-D, S-G-D is ranked the second, and S-M-N-D is ranked the third.

TABLE 7

| Stream mode entry: | |
|---|---|
| Match | Instruction |
| Service 3 | Group3 |

| Group mode entry: | | | |
|---|---|---|---|
| GID | TYPE | ACTION_BUCKETS | State |
| 3 | Main | Ingress port being P8 and egress port being P7, m | Active |
| | | Ingress port being P9 and egress port being P7, m | Active |
| | | Ingress port being P10 and egress port being P7, 2 | Active |
| | | Ingress port being P11 and egress port being P7, 1 | Active |
| | | Ingress port being P12 and egress port being P7, 3 | Active |

Table 7 includes a stream mode table and a group mode table that are established by the device D. In the stream mode table, content of a match (Match) entry may be an identifier of the service 3, and content of an action instruction (Instruction) entry for the service 3 may be an identifier Group3 of the group mode table. In the group mode table, content of a type (TYPE) entry represents that an activation type is executing an active forwarding rule (which is not defined in the OpenFlow protocol, but is self-defined) that is, activating the forwarding relationships of all service paths in the device D, that is, establishing a correlation for the ingress port P8 and the egress port P7 and establishing a correlation for the ingress port P9 and the egress port P7. Content of an action bucket (ACTION_BUCKETS) entry includes all forwarding rules, that is, the first two entries represent the forwarding relationships of the service paths in the device D, and the latter three entries represent the forwarding relationships of the protection paths in the device D. Meanings of the identifier m and the number in the action bucket (ACTION_BUCKETS) entry are the same as those in Table 6, and no further details are described herein again.

Further, for a priority of each protection path, setting on the side of the source node of the protection path needs to be the same as setting on the side of the sink node of the protection path. For example, for the protection path S-H-D, a priority in the device S and a priority in the device D are both set to 1, so that it can be ensured that when a fault occurs in the service path, protection paths enabled on the side of the source node of the protection path and the side of the sink node of the protection path according to the priorities of the protection paths are the same protection path.

Further, for a node, except an end node of a protection path, on a service path and the protection path, in a service path protection method, steps executed on a side of an SDN controller may include:

Step 1: For the node, except the end node of the protection path, on the service path and the protection path, send a path selection instruction to the node, where the path selection instruction includes a forwarding relationship, of a path on which the node is located, in the node.

The forwarding relationship, of the path on which the node is located, in the node is used to instruct the node to activate the forwarding relationship, of the path on which the node is located, in the node.

Correspondingly, for a node, except an end node of a protection path, on a service path and the protection path, in a service path protection method, steps executed on a side of the node may include:

Step 1: Receive a path selection instruction sent by an SDN controller, where the path selection instruction includes a forwarding relationship, of a path on which the node is located, in the node.

Step 2: Activate the forwarding relationship, of the path on which the node is located, in the node according to the forwarding relationship, indicated in the path selection instruction, of the path on which the node is located, in the node.

Further, in this step, when the path on which the node is located is a service path, a forwarding relationship of the service path in the node is activated; or when the path on which the node is located is a protection path, a forwarding relationship of the protection path in the node is activated. That is, for a protection path that is not enabled temporarily, a node on the protection path also activates the forwarding relationship of the protection path in the node, and it is not required that when a fault occurs in the service path and before the protection path is enabled, the forwarding relationship of the protection path in the node is activated for the node on the protection path.

Further, for the node, except the end node of the protection path, on the service path and the protection path, the forwarding relationship, of the path on which the node is located, in the node needs to be indicated, and a forwarding relationship corresponding to another path except the path on which the node is located does not need to be indicated. Because another path except the path on which the node is located does not pass through the node, when a fault occurs in the service path, the node is not responsible for switching to the protection path.

Further, the node, except the end not of the protection path, on the service path and the protection path may assist the end node of the protection path in detecting a path fault, and when detecting a fault in a path on which the node is located, reports a result to the SDN controller.

Using FIG. 6 as an example, for a node G, except end nodes S and D, on a protection path of a service 1, an ingress port of the protection path of the service 1 on the device G is a port P7, and an egress port is a port P8. The SDN controller sends a path selection instruction to the device G, where the path selection instruction includes a forwarding relationship of the protection path of the service 1 in the device G.

Using an OpenFlow protocol as an example, after the device G receives the path selection instruction sent by the SDN controller, an established entry may be shown in Table 8:

TABLE 8

| Stream mode entry: | |
|---|---|
| Match | Instruction |
| Service 1 | Ingress port being P7 and egress port being P8 |

Table 8 includes a stream mode table established by the device G. In the stream mode table, content of a match (Match) entry may be an identifier of the service 1, and content of an action instruction (Instruction) entry for the service 1 may be the forwarding relationship of the protection path in the device G.

Based on a same invention idea, the embodiments of the present invention further provide a device, an SDN controller, and a system. Because the problem resolving principle of the device, the SDN controller, and the system is similar to that of the foregoing service path protection method, for implementation of the device, the SDN controller, and the system, reference may be made to the implementation of the foregoing method, and repeated parts are not described herein again.

Figure 12:
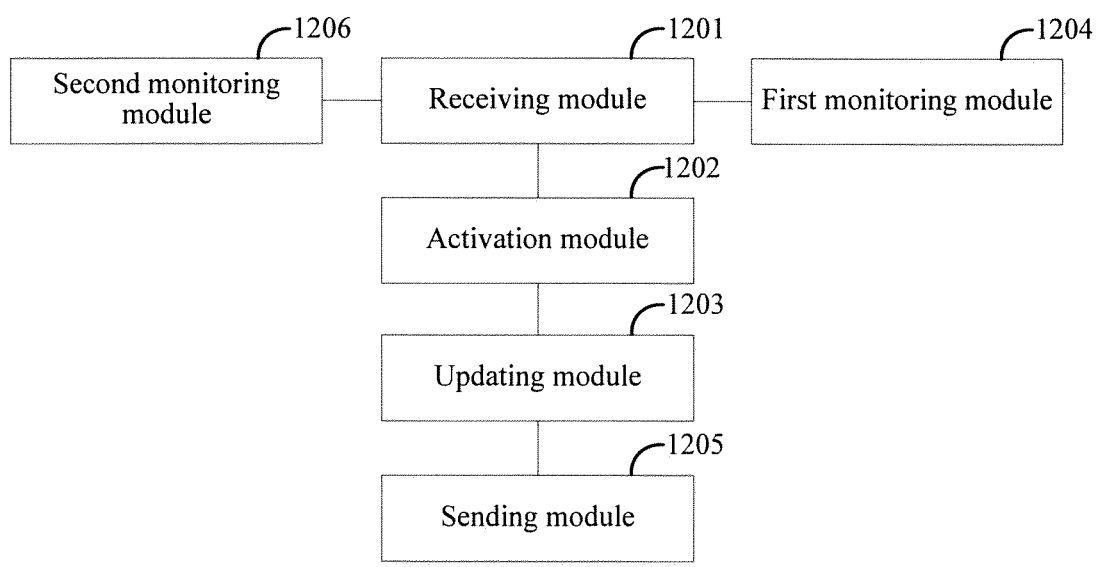
FIG. 12 is a schematic structural diagram of a device according to an embodiment of the present invention.

An embodiment of the present invention provides a device, applied to an end node of a protection path. As shown in FIG. 12, the device includes the following modules:

a receiving module 1201, configured to receive a path selection instruction sent by an SDN controller, where the path selection instruction includes a service path and protection path activation type, a forwarding relationship of a service path in the end node, and a forwarding relationship of the protection path in the end node, and the protection path is a standby path for protecting a path between specified nodes on the service path;

an activation module 1202, configured to activate at least one forwarding relationship of the forwarding relationship of the service path in the end node and the forwarding relationship of the protection path in the end node according to the service path and protection path activation type received by the receiving module 1201; and an updating module 1203, configured to: when it is determined that a fault occurs in the service path, update the at least one forwarding relationship of the forwarding relationship of the service path in the end node and the forwarding relationship of the protection path in the end node according to the service path and protection path activation type received by the receiving module 1201.

Further, the activation module 1202 is specifically configured to: when the device is a source node of the protection path and the service path and protection path activation type is used to instruct the source node to enable the service path and the protection path, separately activate a forwarding relationship of the service path in the source node and a forwarding relationship of the protection path in the source node; or when the service path and protection path activation type is used to instruct the source node to enable the service path, activate a forwarding relationship of the service path in the source node.

Further, the activation module 1202 is specifically configured to: when the device is a sink node of the protection path, activate a forwarding relationship of the service path in the sink node according to the service path and protection path activation type, where the service path and protection path activation type is used to instruct the sink node to enable the service path.

Further, the device further includes a first monitoring module 1204, where the receiving module 1201 is further configured to receive a monitoring instruction sent by the SDN controller and used to instruct the device to monitor at least one path of the service path and the protection path; and the first monitoring module 1204 is configured to after the activation module 1202 activates the at least one forwarding relationship of the forwarding relationship of the service path in the end node and the forwarding relationship of the protection path in the end node, monitor, according to the monitoring instruction received by the receiving module 1201, the at least one path indicated in the monitoring instruction.

Further, the first monitoring module 1204 is specifically configured to monitor, according to the monitoring instruction, service data transmission on the at least one path indicated in the monitoring instruction and/or a physical link of the at least one path indicated in the monitoring instruction.

Further, the device further includes a sending module 1205 and a second monitoring module 1206, where the sending module 1205 is configured to: after the activation module 1202 activates the at least one forwarding relationship of the forwarding relationship of the service path in the end node and the forwarding relationship of the protection path in the end node, send a notification message indicating that forwarding relationship activation is completed to the SDN controller;

the receiving module 1201 is further configured to: after the sending module 1205 sends the notification message, receive a monitoring instruction sent by the SDN controller and used to instruct the device to monitor at least one path of the service path and the protection path; and the second monitoring module 1206 is configured to: after the receiving module 1201 receives the monitoring instruction, monitor, according to the monitoring instruction, the at least one path indicated in the monitoring instruction.

Further, the second monitoring module 1206 is specifically configured to monitor, according to the monitoring instruction, service data transmission on the at least one path indicated in the monitoring instruction and/or a physical link of the at least one path indicated in the monitoring instruction.

Further, the updating module 1203 is specifically configured to: when it is determined that a fault occurs in the service path, invalidate the forwarding relationship of the service path in the end node; and the sending module 1205 is further configured to: when it is determined that a fault occurs in the service path, send, to the SDN controller, a notification message used to notify the SDN controller that the service path is already disabled and the protection path is enabled for data transmission.

Further, the updating module 1203 is further configured to: when the device is the source node of the protection path and the service path and protection path activation type is used to instruct the source node to enable the service path or when the device is the sink node of the protection path, when it is determined that a fault occurs in the service path, and before or after the device invalidates the forwarding relationship of the service path in the end node, activate the forwarding relationship of the protection path in the end node.

Further, the updating module 1203 is specifically configured to: when the device is the source node of the protection path and the service path and protection path activation type is used to instruct the source node to enable the service path or when the device is the sink node of the protection path, and when it is determined that a fault occurs in the service path, send, to the SDN controller, a fault report used to notify the SDN controller that a fault occurs in the service path; receive a switchover instruction sent by the SDN controller and used to enable the protection path to replace the service path; and invalidate the forwarding relationship of the service path in the end node and activate the forwarding relationship of the protection path in the end node according to the switchover instruction.

Further, the updating module 1203 is specifically configured to: when the device is the source node of the protection path and the service path and protection path activation type is used to instruct the source node to enable the service path or when the device is the sink node of the protection path, and when it is determined that a fault occurs in the service path and there are at least two protection paths for the path between the specified nodes on the service path, determine, according to priorities indicated in the path selection instruction and of the protection paths, a protection path having a highest priority; activate a forwarding relationship of the protection path having the highest priority in the end node and invalidate the forwarding relationship of the service path in the end node.

Figure 13:
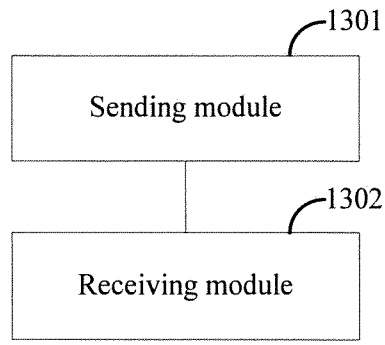
FIG. 13 is a schematic structural diagram of an SDN controller according to an embodiment of the present invention.

An embodiment of the present invention provides an SDN controller. As shown in FIG. 13, the SDN controller includes the following modules:

a sending module 1301, configured to: for an end node of a protection path, send a path selection instruction to the end node of the protection path, where the path selection instruction includes a service path and protection path activation type, a forwarding relationship of a service path in the end node, and a forwarding relationship of the protection path in the end node, where the service path and protection path activation type is used by the end node of the protection path to activate at least one forwarding relationship of the forwarding relationship of the service path in the end node and the forwarding relationship of the protection path in the end node according to the service path and protection path activation type; and when it is determined that a fault occurs in the service path, the end node of the protection path updates the at least one forwarding relationship of the forwarding relationship of the service path in the end node and the forwarding relationship of the protection path in the end node according to the service path and protection path activation type, where the protection path is a standby path for protecting a path between specified nodes on the service path.

Further, the sending module 1301 is further configured to: for a node, except the end node of the protection path, on the service path and the protection path, send a path selection instruction to the node, where the path selection instruction includes a forwarding relationship, of a path on which the node is located, in the node, and the forwarding relationship, of the path on which the node is located, in the node is used to instruct the node to activate the forwarding relationship, of the path on which the node is located, in the node.

Further, the sending module 1301 is further configured to send a monitoring instruction used to instruct the end node of the protection path to monitor at least one path of the service path and the protection path to the end node of the protection path.

Further, the SDN controller further includes a receiving module 1302, where the receiving module 1302 is configured to: after the path selection instruction is sent to the end node of the protection path, receive a notification message sent by the end node of the protection path and indicating that forwarding relationship activation is completed; and the sending module 1301 is further configured to send a monitoring instruction used to instruct the end node of the protection path to monitor at least one path of the service path and the protection path to the end node of the protection path.

Further, the receiving module 1302 is further configured to: when it is determined a fault occurs in the service path, receive a notification message sent by the end node of the protection path and used to notify that the service path is already disabled and the protection path is enabled to perform data transmission.

Further, the receiving module 1302 is further configured to: when it is determined that a fault occurs in the service path, receive a fault report sent by the end node of the protection path and used to notify that a fault occurs in the service path; and the sending module 1301 is further configured to send a switchover instruction used to enable the protection path to replace the service path to the end node of the protection path, where the switchover instruction is used to instruct the end node of the protection path to invalidate the forwarding relationship of the service path in the end node and activate the forwarding relationship of the protection path in the end node.

An embodiment of the present invention provides a service path protection system, including a plurality of the foregoing devices, and the foregoing SDN controller.

Based on a same invention idea, the embodiments of the present invention further provide a device, an SDN controller, and a system. Because the problem resolving principle of the device, the SDN controller, and the system is similar to that of the foregoing service path protection method, for implementation of the device, the SDN controller, and the system, reference may be made to the implementation of the foregoing method, and repeated parts are not described herein again.

Figure 14:
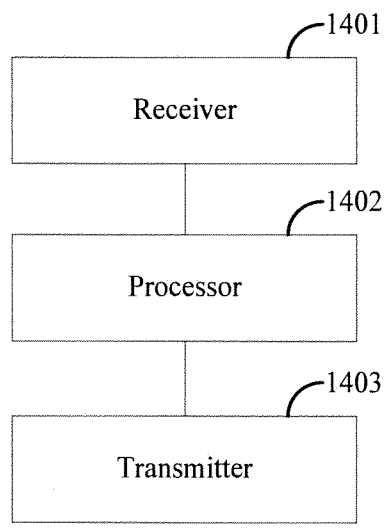
FIG. 14 is a schematic structural diagram of a device according to an embodiment of the present invention.

An embodiment of the present invention provides a device, applied to an end node of a protection path. As shown in FIG. 14, the device includes the following parts:

a receiver 1401, configured to receive a path selection instruction sent by an SDN controller, where the path selection instruction includes a service path and protection path activation type, a forwarding relationship of a service path in the end node, and a forwarding relationship of the protection path in the end node, and the protection path is a standby path for protecting a path between specified nodes on the service path; and a processor 1402, configured to activate at least one forwarding relationship of the forwarding relationship of the service path in the end node and the forwarding relationship of the protection path in the end node according to the service path and protection path activation type received by the receiver 1401, and when it is determined that a fault occurs in the service path, update the at least one forwarding relationship of the forwarding relationship of the service path in the end node and the forwarding relationship of the protection path in the end node according to the service path and protection path activation type received by the receiver 1401.

Further, the processor 1402 is specifically configured to: when the device is a source node of the protection path and the service path and protection path activation type is used to instruct the source node to enable the service path and the protection path, separately activate a forwarding relationship of the service path in the source node and a forwarding relationship of the protection path in the source node; or when the service path and protection path activation type is used to instruct the source node to enable the service path, activate a forwarding relationship of the service path in the source node.

Further, the processor 1402 is specifically configured to: when the device is a sink node of the protection path, activate a forwarding relationship of the service path in the sink node according to the service path and protection path activation type, where the service path and protection path activation type is used to instruct the sink node to enable the service path.

Further, the receiver 1401 is further configured to receive a monitoring instruction sent by the SDN controller and used to instruct the device to monitor at least one path of the service path and the protection path; and the processor 1402 is further configured to: after the at least one forwarding relationship of the forwarding relationship of the service path in the end node and the forwarding relationship of the protection path in the end node is activated, monitor, according to the monitoring instruction received by the receiver 1401, the at least one path indicated in the monitoring instruction.

Further, the processor 1402 is specifically configured to monitor, according to the monitoring instruction, service data transmission on the at least one path indicated in the monitoring instruction and/or a physical link of the at least one path indicated in the monitoring instruction.

Further, the device further includes a transmitter 1403, where the transmitter 1403 is configured to: after the processor 1402 activates the at least one forwarding relationship of the forwarding relationship of the service path in the end node and the forwarding relationship of the protection path in the end node, send a notification message indicating that forwarding relationship activation is completed to the SDN controller;

the receiver 1401 is further configured to: after the transmitter 1403 sends the notification message, receive a monitoring instruction sent by the SDN controller and used to instruct the device to monitor at least one path of the service path and the protection path; and the processor 1402 is further configured to: after the receiver 1401 receives the monitoring instruction, monitor, according to the monitoring instruction, the at least one path indicated in the monitoring instruction.

Further, the processor 1402 is specifically configured to monitor, according to the monitoring instruction, service data transmission on the at least one path indicated in the monitoring instruction and/or a physical link of the at least one path indicated in the monitoring instruction.

Further, the processor 1402 is specifically configured to: when it is determined that a fault occurs in the service path, invalidate the forwarding relationship of the service path in the end node; and the transmitter 1403 is further configured to: when it is determined that a fault occurs in the service path, send, to the SDN controller, a notification message used to notify the SDN controller that the service path is already disabled and the protection path is enabled for data transmission.

Further, the processor 1402 is further configured to: when the device is the source node of the protection path and the service path and protection path activation type is used to instruct the source node to enable the service path or when the device is the sink node of the protection path, when it is determined that a fault occurs in the service path, and before or after the device invalidates the forwarding relationship of the service path in the end node, activate the forwarding relationship of the protection path in the end node.

Further, the processor 1402 is specifically configured to: when the device is the source node of the protection path and the service path and protection path activation type is used to instruct the source node to enable the service path or when the device is the sink node of the protection path, and when it is determined that a fault occurs in the service path, send, to the SDN controller, a fault report used to notify the SDN controller that a fault occurs in the service path; receive a switchover instruction sent by the SDN controller and used to enable the protection path to replace the service path; and invalidate the forwarding relationship of the service path in the end node and activate the forwarding relationship of the protection path in the end node according to the switchover instruction.

Further, the processor 1402 is specifically configured to: when the device is the source node of the protection path and the service path and protection path activation type is used to instruct the source node to enable the service path or when the device is the sink node of the protection path, and when it is determined that a fault occurs in the service path and there are at least two protection paths for the path between the specified nodes on the service path, determine, according to priorities indicated in the path selection instruction and of the protection paths, a protection path having a highest priority; activate a forwarding relationship of the protection path having the highest priority in the end node and invalidate the forwarding relationship of the service path in the end node.

Figure 15:
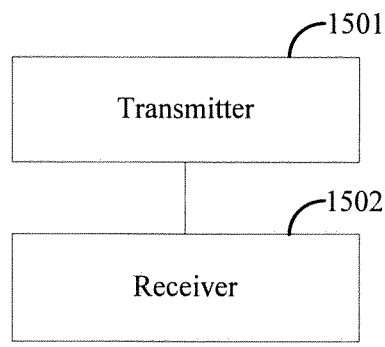
FIG. 15 is a schematic structural diagram of an SDN controller according to an embodiment of the present invention.

An embodiment of the present invention provides an SDN controller. As shown in FIG. 15, the SDN controller includes the following parts:

a transmitter 1501, configured to: for an end node of a protection path, send a path selection instruction to the end node of the protection path, where the path selection instruction includes a service path and protection path activation type, a forwarding relationship of a service path in the end node, and a forwarding relationship of the protection path in the end node, where the service path and protection path activation type is used by the end node of the protection path to activate at least one forwarding relationship of the forwarding relationship of the service path in the end node and the forwarding relationship of the protection path in the end node according to the service path and protection path activation type; and when it is determined that a fault occurs in the service path, the end node of the protection path updates the at least one forwarding relationship of the forwarding relationship of the service path in the end node and the forwarding relationship of the protection path in the end node according to the service path and protection path activation type, where the protection path is a standby path for protecting a path between specified nodes on the service path.

Further, the transmitter 1501 is further configured to: for a node, except the end node of the protection path, on the service path and the protection path, send a path selection instruction to the node, where the path selection instruction includes a forwarding relationship, of a path on which the node is located, in the node, and the forwarding relationship, of the path on which the node is located, in the node is used to instruct the node to activate the forwarding relationship, of the path on which the node is located, in the node.

Further, the transmitter 1501 is further configured to send a monitoring instruction used to instruct the end node of the protection path to monitor at least one path of the service path and the protection path to the end node of the protection path.

Further, the SDN controller further includes a receiver 1502, where the receiver 1502 is configured to: after the path selection instruction is sent to the end node of the protection path, receive a notification message sent by the end node of the protection path and indicating that forwarding relationship activation is completed; and the transmitter 1501 is further configured to send a monitoring instruction used to instruct the end node of the protection path to monitor at least one path of the service path and the protection path to the end node of the protection path.

Further, the receiver 1502 is further configured to: when it is determined a fault occurs in the service path, receive a notification message sent by the end node of the protection path and used to notify that the service path is already disabled and the protection path is enabled to perform data transmission.

Further, the receiver 1502 is further configured to: when it is determined that a fault occurs in the service path, receive a fault report sent by the end node of the protection path and used to notify that a fault occurs in the service path; and the transmitter 1501 is further configured to send a switchover instruction used to enable the protection path to replace the service path to the end node of the protection path, where the switchover instruction is used to instruct the end node of the protection path to invalidate the forwarding relationship of the service path in the end node and activate the forwarding relationship of the protection path in the end node.

An embodiment of the present invention provides a service path protection system, including a plurality of the foregoing devices, and the foregoing SDN controller.

Functions of the foregoing units may correspond to processing steps in the processes shown in FIG. 1, FIG. 3 to FIG. 5, FIG. 7 to FIG. 8, and FIG. 10, and no further details are described herein again.

In the service path protection method, the controller, the device, and the system that are provided in the embodiments of the present invention, an end node of a protection path receives a path selection instruction sent by an SDN controller, where the path selection instruction includes a service path and protection path activation type, a forwarding relationship of a service path in the end node, and a forwarding relationship of the protection path in the end node; the end node of the protection path activates at least one forwarding relationship of the forwarding relationship of the service path in the end node and the forwarding relationship of the protection path in the end node according to the service path and protection path activation type; and when it is determined that a fault occurs in the service path, the end node of the protection path updates the at least one forwarding relationship of the forwarding relationship of the service path in the end node and the forwarding relationship of the protection path in the end node according to the service path and protection path activation type. A forwarding relationship, of a path indicated in the activation type, in the end node is activated according to the activation type in the path selection instruction, and when a fault occurs in the service path, the at least one forwarding relationship of the forwarding relationship of the service path in the end node and the forwarding relationship of the protection path in the end node is updated according to the activation type, so that the protection path can be used in time for data transmission, and a problem that in an SDN technology, when a fault occurs in a service path, a protection path cannot be used to protect the service path is resolved.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A device applied to an end node of a protection path, the device comprising:
   a computer readable medium having a plurality of computer executable instructions; and
   a processor configured, when executing the computer executable instructions, to control the end node to:
   receive a path selection instruction sent by a software defined networking (SDN) controller, wherein the path selection instruction comprises a service path and protection path activation type, a forwarding relationship of a service path in the end node, and a forwarding relationship of the protection path in the end node,
   activate at least one forwarding relationship of the forwarding relationship of the service path in the end node and the forwarding relationship of the protection path in the end node according to the service path and protection path activation type, in response to an occurrence of a fault in the service path, send a fault report to the SDN controller, the fault report for notifying that a fault occurs in the service path, receive, from the SDN controller, a switchover instruction in response to the fault report, and based on the switchover instruction, invalidate the forwarding relationship of the service path in the end node and activate the forwarding relationship of the protection path in the end node;

wherein the protection path is a standby path for protecting a path between specified nodes on the service path; and wherein to invalidate the forwarding relationship of the service path in the end node and activate the forwarding relationship of the protection path in the end node, the processor is configured to control the end node to update, in a group mode table, a state field of a first entry associated with the forwarding relationship of the service path to a first value that indicates an inactive status, and update, in the group mode table, a state field of a second entry associated with the forwarding relationship of the protection path to a second value that indicates an active status, wherein the group mode table comprises a state field and a type field for each entry to indicate a service path or a protection path, and a port field associated with the state field to indicate an ingress port and an egress port associated with the active or inactive state field.

2. The device according to claim 1, wherein when the end node of the protection path is a source node of the protection path, the processor is further configured to control the end node to:

when the service path and protection path activation type is for instructing the source node to enable the service path and the protection path, separately activate a forwarding relationship of the service path in the source node and a forwarding relationship of the protection path in the source node; or when the service path and protection path activation type is for instructing the source node to enable the service path, activating a forwarding relationship of the service path in the source node.

3. The device according to claim 1, wherein:

when the end node of the protection path is a sink node of the protection path, the service path and protection path activation type is for instructing the sink node to enable the service path; and the processor is further configured to control the sink node to activate a forwarding relationship of the service path in the sink node according to the service path and protection path activation type.

4. The device according to claim 1, wherein the processor is further configured to control the end node to:

receive a monitoring instruction sent by the SDN controller and for instructing the end node to monitor at least one path of the service path and the protection path; and after activating at least one forwarding relationship of the forwarding relationship of the service path in the end node and the forwarding relationship of the protection path in the end node according to the service path and protection path activation type, monitor, according to the monitoring instruction, the at least one path indicated in the monitoring instruction.

5. The device according to claim 1, wherein the processor is further configured to control the end node to:

after activating at least one forwarding relationship of the forwarding relationship of the service path in the end node and the forwarding relationship of the protection path in the end node according to the service path and protection path activation type: send a notification message indicating that forwarding relationship activation is completed to the SDN controller;

receive a monitoring instruction sent by the SDN controller and for instructing the end node of the protection path to monitor at least one path of the service path and the protection path; and monitor, according to the monitoring instruction, the at least one path indicated in the monitoring instruction.

6. The device according to claim 4, wherein the processor is further configured to control the end node to:

monitor, according to the monitoring instruction, at least one of: service data transmission on the at least one path indicated in the monitoring instruction, and a physical link of the at least one path indicated in the monitoring instruction.

7. A service path protection method, comprising:

sending, by a software defined networking (SDN) controller, a path selection instruction to an end node of a protection path, wherein the path selection instruction comprises a service path and protection path activation type, a forwarding relationship of a service path in the end node, and a forwarding relationship of the protection path in the end node, and wherein the service path and protection path activation type enables the end node of the protection path to update a field of an entry in a group mode table to a value that indicates an active status in order to activate at least one forwarding relationship of the forwarding relationship of the service path in the end node and the forwarding relationship of the protection path in the end node according to the service path and protection path activation type, wherein the entry is associated with the at least one forwarding relationship;

in response to an occurrence of a fault in the service path, receiving, by the SDN controller, a fault report sent by the end node of the protection path and for notifying that a fault occurs in the service path; and sending, by the SDN controller, a switchover instruction for enabling the protection path to replace the service path to the end node of the protection path, wherein the switchover instruction is for instructing the end node of the protection path to update a state field of a first entry in the group mode table to a first value that indicates an inactive status in order to invalidate the forwarding relationship of the service path in the end node and update a state field of a second entry in the group mode table to a second value that indicates an active status in order to activate the forwarding relationship of the protection path in the end node, wherein the group mode table comprises a state field and a type field for each entry to indicate a service path or a protection path, and a port field associated with the state field to indicate an ingress port and an egress port associated with the active or inactive state field, wherein the protection path is a standby path for protecting a path between specified nodes on the service path.

8. The method according to claim 7, further comprising:
sending a path selection instruction to a second node, other than the end node of the protection path, on the service path and the protection path, wherein the path selection instruction comprises a forwarding relationship, of a path on which the second node is located, in the second node, wherein the forwarding relationship, of the path on which the second node is located, in the second node is for instructing the second node to activate the forwarding relationship, of the path on which the second node is located, in the second node.

9. The method according to claim 7, further comprising:
sending a monitoring instruction for instructing the end node of the protection path to monitor at least one path of the service path and the protection path to the end node of the protection path.

10. The method according to claim 7, wherein after sending a path selection instruction to the end node of the protection path, the method further comprises:
receiving a notification message sent by the end node of the protection path and indicating that forwarding relationship activation is completed; and
sending a monitoring instruction for instructing the end node of the protection path to monitor at least one path of the service path and the protection path to the end node of the protection path.

11. The method according to claim 7, wherein when there are at least two protection paths for the path between the specified nodes on the service path, the path selection instruction is further for indicating priorities of the protection paths.

12. A software defined networking (SDN) controller, comprising:
a computer readable medium having a plurality of computer executable instructions;
a processor configured, when executing the computer executable instructions, to control the SDN controller to:
send a path selection instruction to an end node of a protection path, wherein the path selection instruction comprises a service path and protection path activation type, a forwarding relationship of a service path in the end node, and a forwarding relationship of the protection path in the end node, and wherein the service path and protection path activation type enables the end node of the protection path to update a state field of an entry in a group mode table to a first value that indicates an active status in order to activate at least one forwarding relationship of the forwarding relationship of the service path in the end node and the forwarding relationship of the protection path in the end node according to the service path and protection path activation type, wherein the entry is associated with the at least one forwarding relationship, wherein the group mode table comprises a state field and a type field for each entry, in response to an occurrence of a fault in the service path, receive a fault report sent by the end node of the protection path and for notifying that a fault occurs in the service path, and
send a switchover instruction for enabling the protection path to replace the service path to the end node of the protection path, wherein the switchover instruction is for instructing the end node of the protection path to update a state field of a first entry in the group mode table to a second value that indicates an inactive status in order to invalidate the forwarding relationship of the service path in the end node and update a state field of a second entry in the group mode table to the first value that indicates the active status in order to activate the forwarding relationship of the protection path in the end node, wherein the group mode table comprises a state field and a type field for each entry to indicate a service path or a protection path, and a port field associated with the state field to indicate an ingress port and an egress port associated with the active or inactive state field; and
wherein the protection path is a standby path for protecting a path between specified nodes on the service path.

13. The SDN controller according to claim 12, wherein the processor is further configured to control the SDN controller to:
send a path selection instruction to a second node, other than the end node of the protection path, on the service path and the protection path, wherein the path selection instruction comprises a forwarding relationship, of a path on which the second node is located, in the second node, and the forwarding relationship, of the path on which the second node is located, in the second node is for instructing the second node to activate the forwarding relationship, of the path on which the second node is located, in the second node.

14. The SDN controller according to claim 12, wherein the processor is further configured to control the SDN controller to:
send a monitoring instruction for instructing the end node of the protection path to monitor at least one path of the service path and the protection path to the end node of the protection path.

15. The SDN controller according to claim 12, wherein the processor is further configured to control the SDN controller to:
after the path selection instruction is sent to the end node of the protection path, receive a notification message sent by the end node of the protection path and indicating that forwarding relationship activation is completed; and
send a monitoring instruction for instructing instruct the end node of the protection path to monitor at least one path of the service path and the protection path to the end node of the protection path.

* * * * *